United States Patent [19]

Neuenschwander

[11] Patent Number: 6,163,949
[45] Date of Patent: Dec. 26, 2000

[54] METHOD FOR MANUFACTURING LONG, SLENDER LAMINA STACK FROM NONUNIFORM LAMINAE

[75] Inventor: Thomas R. Neuenschwander, Fort Wayne, Ind.

[73] Assignee: L.H. Carbide Corporation, Fort Wayne, Ind.

[21] Appl. No.: 09/416,446

[22] Filed: Oct. 12, 1999

Related U.S. Application Data

[60] Division of application No. 09/152,979, Sep. 14, 1998, which is a continuation-in-part of application No. 08/963,795, Nov. 4, 1997, which is a continuation-in-part of application No. 08/658,595, Jun. 5, 1996, Pat. No. 5,799,387.

[51] Int. Cl.$^7$ .................................................. B32B 3/24
[52] U.S. Cl. ........................... 29/521; 310/217; 310/216; 428/64; 428/65; 428/133
[58] Field of Search ............................. 29/521; 310/216, 310/217; 428/64, 65, 133

[56] References Cited

U.S. PATENT DOCUMENTS

| | | | |
|---|---|---|---|
| 2,478,983 | 8/1949 | Runbakern et al. | 175/361 |
| 2,576,328 | 11/1951 | Allison | 164/104 |
| 2,671,951 | 3/1954 | Sliwiak | 29/155.61 |
| 2,975,312 | 3/1961 | Ploran | 310/217 |
| 3,146,420 | 8/1964 | Knobel | 336/212 |
| 3,202,851 | 8/1965 | Zimmerle et al. | 310/259 |
| 3,203,077 | 8/1965 | Zimmerle | 29/155.5 |
| 3,437,966 | 4/1969 | Tolley | 336/90 |
| 3,497,949 | 3/1970 | Salt | 29/609 |
| 3,512,435 | 5/1970 | Bossmann et al. | 83/71 |
| 3,524,370 | 8/1970 | Thompson | 83/255 |
| 3,546,647 | 12/1970 | Roddy et al. | 336/92 |

(List continued on next page.)

FOREIGN PATENT DOCUMENTS

| | | |
|---|---|---|
| 0 084568 | 8/1983 | European Pat. Off. . |
| 0655825A | 5/1995 | European Pat. Off. . |
| 0 738 831 | 10/1996 | European Pat. Off. . |
| 0 738 831 A2 | 10/1996 | European Pat. Off. ........... F02P 3/02 |
| 2017379 | 10/1971 | Germany . |
| 26 31 188 | 1/1978 | Germany . |
| 27 51 123 | 5/1979 | Germany . |
| 56-107764 | 7/1981 | Japan . |
| 56-129556 | 10/1981 | Japan . |
| 58-66557 | 4/1983 | Japan . |
| 06022508 | 1/1994 | Japan . |
| 06090550A | 3/1994 | Japan . |
| 2206453A | 1/1989 | United Kingdom . |

OTHER PUBLICATIONS

PCT/US97/09710 International Search Report, Mailed Oct. 8, 1997.

"Computer Numerical Control of Production of Rotor and Stator Lamination Segments for Large Electrical Generators and Motors," Arthur Silverton, *MetalWorking* '82.

*Primary Examiner*—Lee Young
*Assistant Examiner*—Rick Kiltae Chang
*Attorney, Agent, or Firm*—Baker & Daniels

[57] ABSTRACT

A method of manufacturing an elongate stack of interlocked laminae in a die assembly. The method includes the steps of stamping a first lamina having generally opposed first and second edges in the strip stock material, stamping at least one first interlock means for engaging another lamina in the first lamina, separating the first lamina from the strip stock material, placing the first lamina into the choke passageway, the first and second edges of the first lamina frictionally engaging the choke passageway, stamping a second lamina having first and second elongate edges in the strip stock material, stamping at least one second interlock means for engaging another lamina in the second lamina, at least partially engaging the first and second interlocking means, separating the second lamina from the strip stock material, placing the second lamina into the choke passageway, and frictionally engaging the choke passageway along the first and second elongate edges of only one of the first and second laminae.

16 Claims, 25 Drawing Sheets

U.S. PATENT DOCUMENTS

| | | | |
|---|---|---|---|
| 3,590,208 | 6/1971 | Martini et al. | 219/92 |
| 3,606,674 | 9/1971 | Givan | 29/596 |
| 3,738,569 | 6/1973 | Killaly, Sr. | 234/43 |
| 3,783,318 | 1/1974 | Widstrand | 310/216 |
| 3,802,068 | 4/1974 | Scott | 29/598 |
| 3,823,460 | 7/1974 | Bergmann | 29/203 |
| 3,834,013 | 9/1974 | Gerstle | 29/596 |
| 3,840,983 | 10/1974 | Ryff | 29/598 |
| 4,110,895 | 9/1978 | Mitsui | 29/564.2 |
| 4,149,309 | 4/1979 | Mitsui | 29/596 |
| 4,160,182 | 7/1979 | Mitsui | 310/214 |
| 4,162,734 | 7/1979 | Dangelmaier et al. | 414/27 |
| 4,264,663 | 4/1981 | Beenken | 428/133 |
| 4,272,579 | 6/1981 | Mitsui | 29/521 |
| 4,280,275 | 7/1981 | Mitsui | 29/732 |
| 4,364,169 | 12/1982 | Kawano et al. | 29/596 |
| 4,383,356 | 5/1983 | Fichtner | 29/598 |
| 4,445,272 | 5/1984 | Bruhn et al. | 29/598 |
| 4,464,826 | 8/1984 | Bair | 29/593 |
| 4,538,345 | 9/1985 | Diederichs | 29/596 |
| 4,578,853 | 4/1986 | Wurth | 29/598 |
| 4,597,168 | 7/1986 | Oboshi et al. | 29/596 |
| 4,619,028 | 10/1986 | Neuenschwander | 29/33 |
| 4,728,842 | 3/1988 | Martin | 310/217 |
| 4,736,516 | 4/1988 | Pfaffenzeller et al. | 29/732 |
| 4,738,020 | 4/1988 | Neuenschwander | 29/598 |
| 4,809,429 | 3/1989 | Martin | 29/736 |
| 4,827,237 | 5/1989 | Blackburn | 336/220 |
| 4,888,866 | 12/1989 | Hansen | 29/598 |
| 4,897,916 | 2/1990 | Blackburn | 29/609 |
| 4,900,636 | 2/1990 | Takenouchi et al. | 428/571 |
| 4,979,285 | 12/1990 | Martin | 29/598 |
| 5,075,150 | 12/1991 | Webb et al. | 428/162 |
| 5,087,849 | 2/1992 | Neuenschwander | 310/216 |
| 5,123,155 | 6/1992 | Neuenschwander | 29/596 |
| 5,128,646 | 7/1992 | Suzuki et al. | 336/110 |
| 5,142,178 | 8/1992 | Kloster et al. | 310/217 |
| 5,163,217 | 11/1992 | Sakanishi | 29/564.6 |
| 5,174,009 | 12/1992 | Martin | 29/564.6 |
| 5,255,425 | 10/1993 | Kanno | 29/596 |
| 5,338,996 | 8/1994 | Yamamoto | 310/217 |
| 5,349,320 | 9/1994 | Suzuki et al. | 336/92 |
| 5,349,740 | 9/1994 | Neuenschwander | 29/596 |
| 5,359,763 | 11/1994 | Neuenschwander | 29/738 |
| 5,373,622 | 12/1994 | Neuenschwander | 29/596 |
| 5,377,115 | 12/1994 | Neuenschwander | 364/468 |
| 5,406,243 | 4/1995 | Jenkins et al. | 336/217 |
| 5,539,974 | 7/1996 | Isayama | 29/598 |
| 5,603,155 | 2/1997 | Satomi et al. | 29/598 |
| 5,632,259 | 5/1997 | Konda et al. | 123/634 |
| 5,636,432 | 6/1997 | Usher et al. | 29/596 |
| 5,649,349 | 7/1997 | Greenway | 29/598 |
| 5,671,526 | 9/1997 | Merlano | 29/609 |
| 5,685,065 | 11/1997 | Suzuki et al. | 29/606 |
| 5,703,556 | 12/1997 | Kituta et al. | 336/83 |
| 5,703,559 | 12/1997 | Emmerich et al. | 336/234 |
| 5,755,023 | 5/1998 | Neuenschwander | 29/596 |
| 5,764,124 | 6/1998 | Nakamichi et al. | 336/92 |
| 5,767,758 | 6/1998 | Sakamaki | 336/84 M |
| 5,794,603 | 8/1998 | Miyamoto | 123/634 |
| 5,915,750 | 6/1999 | Usher et al. | 29/596 |
| 5,986,532 | 11/1999 | Kituta et al. | 336/83 |
| 6,002,321 | 12/1999 | Laine | 336/212 |
| 6,005,464 | 12/1999 | Sakamaki et al. | 336/96 |

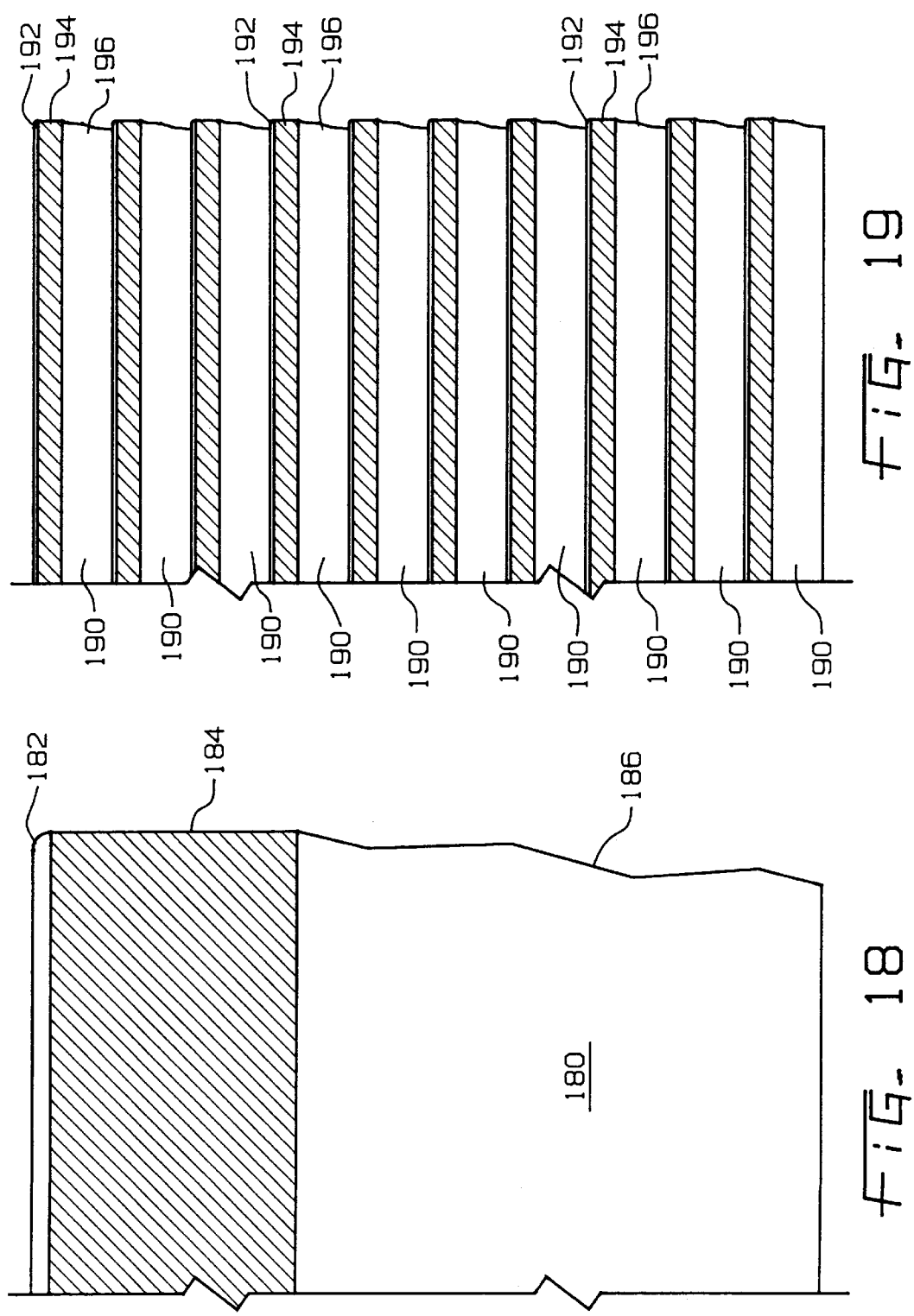

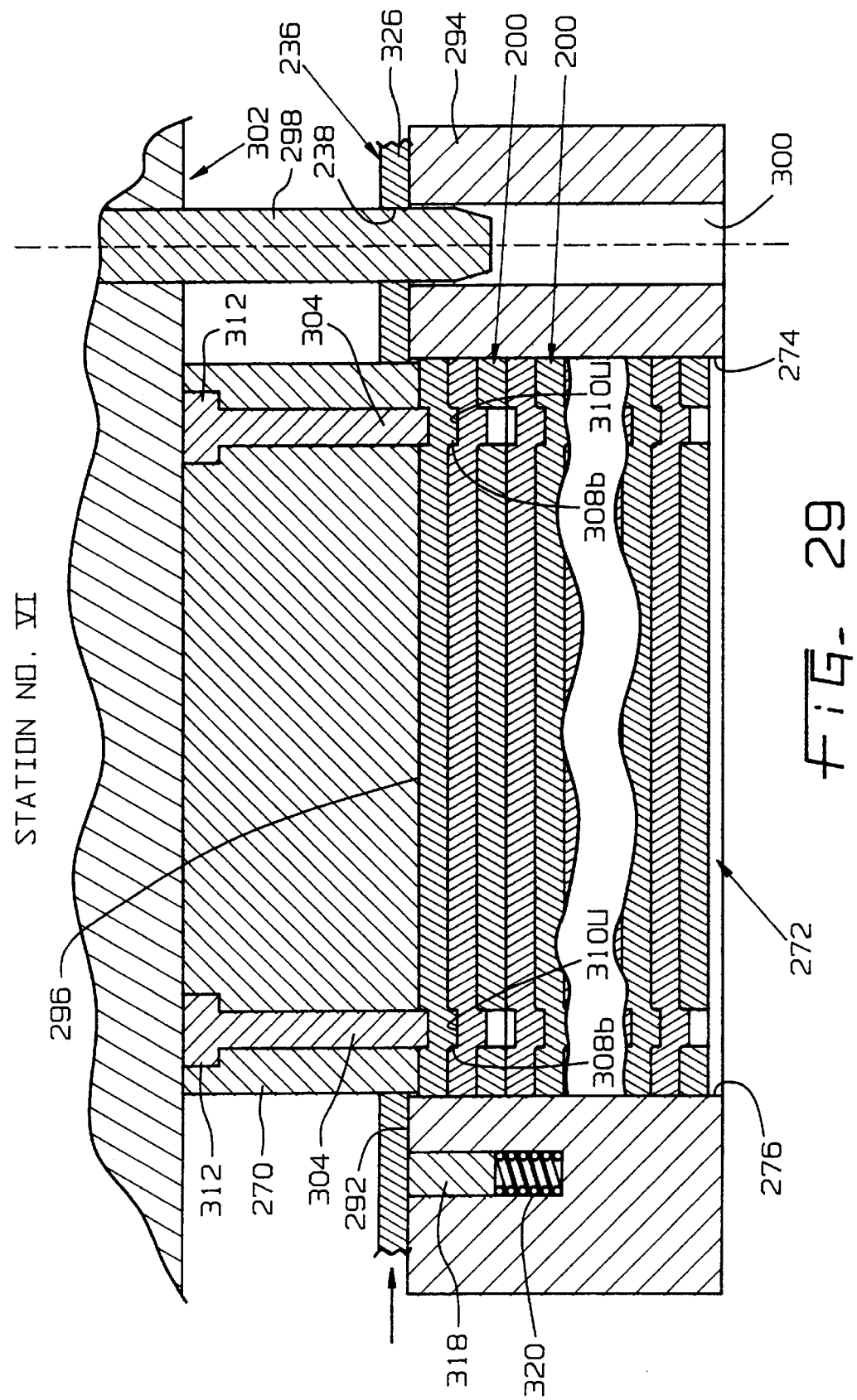

METHOD FOR MANUFACTURING LONG, SLENDER LAMINA STACK FROM NONUNIFORM LAMINAE

This is a division of application Ser. No. 09/152,979 as originally filed on Sep. 14, 1998, which is a Continuation-In-Part of U.S. patent application Ser. No. 08/963,795, filed on Nov. 4, 1997, and which is a Continuation-In-Part of U.S. patent application Ser. No. 08/658,595, filed Jun. 5, 1996 now U.S. Pat. No. 5,799,387.

BACKGROUND OF THE INVENTION

1. Field of the Invention

The present invention relates generally to laminated parts. More particularly, the present invention relates to lamina stacks, and especially long, slender lamina stacks, formed by stamping a plurality of lamina layers from a sheet or strip of stock material and the methods and apparatuses, i.e., progressive dies, used in the manufacture of such laminated parts.

2. Description of the Related Art

The manufacture of parts, e.g., stators and rotors for electric motors, employing stacked laminae is well known in the art. Typically, the laminae are blanked from a continuous strip stock and then stacked and bound together to form the completed part. Progressive die assemblies for producing laminated stacks, wherein a strip of lamina material is fed through a sequence of punching steps to progressively form the laminae to the desired end configuration, are also well known.

It is also known to form, in the laminae, interlock tabs which extend below the generally planar lamina surface and engage slots formed in the next lower lamina. In this manner, a plurality of laminae may be stamped from a single sheet of strip stock and formed into an interconnected lamina stack in the die by means of interlocking tabs and slots. More specifically, to form an interconnected lamina stack each lamina, except the bottom lamina of the stack, may have a plurality of arcuately spaced interlock tabs (typically ranging from 3 to 8 circumferentially disposed tabs) depressed from the lamina lower surface adjacent to slots formed in the next lower lamina. Each interlock tab engages a corresponding slot in the next lower lamina of the stack, generally by the entire thickness of the tab. The bottom lamina of the stack may have the interlock tabs blanked and removed to avoid interlocking the bottom lamina with the next lower lamina which forms the top lamina of the previous stack. In rare instances the tab may lock as deeply as two lamina thicknesses, in which case two end laminae must be blanked.

Rotor laminae generally include a plurality of skewed conductor slots which are formed around the periphery of the rotor stack in arcuately spaced relation to one another. The conductor slots are arcuately spaced in an individual lamina in a fixed relationship to one another and, in a rotor stack, are skewed relative to an adjacent lamina by rotationally indexing the partially completed rotor stack with respect to the last produced lamina being attached thereto. Indexing involves rotating the rotor stack and the last produced lamina relative to each other by a predetermined rotational increment so that, when the laminae are combined in a stack, the rotor conductor bar slot defined by adjacent conductor slots are skewed or slanted relative to the stack axis. Stator stacks, on the other hand, include winding slots around the inner periphery of the stack which extend parallel to the stack axis, without skew, and are shaped to receive the stator windings. In some circumstances, however, it may be desired to build an "inside-out" motor wherein the outer lamina stack forms the rotor and would, thus, require skewed slots.

Another system of forming a stack involves loosely stacking the laminae as they are formed and blanked from the stock material in a progressive die assembly. After all the laminae for a given stack are collected, they are shuttled to a pressing station and the laminae are pressed together to engage the interlock tabs and thereby form the lamina stack. Loosely stacking the laminae after they are blanked from strip stock has several disadvantages; loose stacking and subsequent pressing does not as consistently lock adjacent laminae together; the required handling slows production times; and the system lacks a means for automatically correcting thickness inconsistencies of the stock material or creating a desired skew angle for the conductor slots. A similar process can be employed without the use of interlocking features on the laminae. Assembly of the non-interlocked laminae requires the welding, keying or riveting (or pinning) of the laminae to interconnect the laminae in a stack.

In response to these problems, an autorotation system for compensating for the nonuniform stock thickness was developed which both rotates and interlocks the stacked laminae. This system compensates for variations in lamina thickness while still properly skewing the conductor slots of rotor laminae, as described in U.S. Pat. Nos. 4,619,028; 4,738,020; 5,087,849 and 5,123,155, all assigned to the assignee of the present invention and the disclosures of which are incorporated herein by reference. In the system disclosed in the aforementioned patents, the choke barrel or passageway holding the lamina stack may be automatically rotated before each lamina is blanked from the strip stock and the lamina's circumferentially disposed tabs are interlocked with the slots of the uppermost lamina of the incomplete lamina stack within the barrel. Alternatively, the choke may be automatically rotated with every other press cycle, every third press cycle, and so on.

In the apparatus and method disclosed in the aforementioned patents, the individual laminae are typically rotated through an angle of 180°. Although the laminae may be rotated through other angles, the angle must be at least 360°/(number of interlock tabs) so that the interlocking tabs and slots are properly aligned.

The above described improvements have been implemented with rotor laminae and stator laminae which have identical outer perimeters which enables their insertion into a choke barrel designed to hold a lamina having the outer perimeter configuration of the laminae being stacked. Many of these improvements require the use of interlock tabs in combination with autorotation of a partially formed lamina stack.

Autorotation requires the use of a rotating choke barrel which firmly holds the partially formed lamina stack in position as blanked laminae are forced into engagement with the uppermost lamina of the stack. The choke barrel is typically configured to match the outer perimeter of the blanked lamina and may be slightly undersized, e.g., by 0.001 inch, so that the laminae will be firmly held and accurately positioned within the choke barrel. The laminae, after they are located in the choke barrel with an interference fit thereby provide back pressure or resistance which facilitates the entry of the interlock tabs of the next lamina when it is pressed into the choke barrel.

In certain applications, however, it is desirable to have a lamina stack, typically a stator core but also rotor cores in some situations, wherein some of the laminae have an outside perimeter which differs in shape and/or size from the remainder of the stack of laminae, i.e., the laminae in the stack have a plurality of distinguishable configurations. For example, the stator core may incorporate a fastening feature, such as a projecting flange, to provide a mounting surface which is integral with the stator core, or the stator may incorporate a sealing feature to provide a seal between the housing of the motor and the stator core for motors to be used in environments which include flammable vapors. To incorporate such features, a fraction of the laminae in a stack are manufactured with integral portions which provide such features.

Traditionally, the manner in which stator cores having a plurality of outer perimeter configurations have been produced is to stamp the differently configured laminae in separate dies, i.e., each die provides only a single lamina configuration. The plurality of dies produce loose laminae having the desired plurality of outer perimeter configurations. The laminae must then be manually assembled at a station where laminae of the different outer perimeter configurations are placed in the proper vertical stack arrangement and are pressed together to interlock the laminae. Instead of using interlocking tabs, the laminae may also be secured together in some other conventional fashion such as by the use of clamps, pins, rivets or welds.

There are several drawbacks to this manner of manufacturing a lamina core having laminae with a plurality of outer perimeter configurations. For one, the manufacturing process is relatively expensive due to the use of multiple dies and the large amount of labor and handling which is required. Further, production rates with this process tend to be relatively slow. Additionally, the process does not allow for the automatic correction of lamina thickness inconsistencies.

Another problem with this method of manufacture is that it often produces stator cores having winding slots with slight discontinuities and sharp edges. Because separate dies are used to form the differently configured laminae, the stator winding slots are punched by different dies. Although similar in shape, the different punches cannot be precisely identical and will generally have minor inconsistencies which, when the differing laminae are stacked, cause the slots in adjacent laminae to misalign, thereby creating slight discontinuities and sharp edges in the winding slots at the points where the two differently configured laminae meet. These small discontinuities can scratch and damage the winding coil wires which are inserted into the winding slots.

The discontinuities of the projections which define the winding slots and interior surface of the stator core also reduce the efficiency of the electric motor or generator which is produced with the stator core. The efficiency of the motor or generator may be reduced if the gap between the stator core and rotor core is enlarged to account for the discontinuities present on the interior surfaces of the stator core because the efficiency of the motor or generator is decreased as the gap increases.

The manufacture of lamina stacks wherein individual laminae are comprised of two or more discrete segments also presents significant manufacturing difficulties. It is often impractical to manufacture lamina stacks wherein one or more of the laminae is formed by at least two discrete lamina segments. Laminae comprised of a plurality of discrete segments present difficulties in maintaining the proper alignment between the various lamina segments which comprise the individual lamina and between the lamina segments and the other laminae which comprise the remainder of the lamina stack.

Further, in certain applications it is desirable to have a stack of interlocked laminae which is long and slender, and which has a cross-sectional shape having lateral sides defined by the lamina outer edges which do not lie in a substantially common plane; such a stack does not provide a choke-engaging surface which extends substantially along the vertical height of the stack. For example, it is desirable to have an elongate, substantially cylindrically-shaped lamina stack, in which the first, bottommost lamina is narrower than the adjacent, overlying second lamina, which is narrower than the adjacent, overlying third lamina, and so on, with the middlemost lamina(e) defining the widest portion of the substantially circular cross section and subsequent adjacent, overlying laminae each having a reduced width as compared to its adjacent lamina, thus forming a circular cross section, with each of the laminae of the cylindrically-shaped stack interconnected. Notably, the stock material from which a lamina stack may be produced according to the present invention is thin, and the individual laminae stamped therefrom quite flexible. Because the individual laminae of such a stack are long, thin and flexible, and may also have common choke-engaging edges forming a planar choke engaging surface only at the longitudinal ends of the stack, the individual laminae tend to inadequately support the stack in the choke opening or to cause the laminae to bow, rendering the above-described automatic interlocking method unusable for manufacturing such stacks. Moreover, the above-described automatic interlocking method may also be difficult to use in producing interlocked stacks of laminae which are long, thin and flexible, but do have common choke-engaging edges forming a planar surface at the lateral sides of the stack. Prior art manufacturing methods for attaching the long, thin flexible laminae of these stacks together include post-stacking welding, keying or riveting operations or a separate pressing operation for engaging the interlocking tabs, as such prior art operations do not require the laminae to be firmly held and accurately positioned within a choke opening.

What is needed is an apparatus and method for producing long, slender, interlocked stacks of flexible laminae in which the laminae are automatically stamped, stacked and interlocked, the stacks having cross-sectional shapes with side surfaces defined by the side edges of the laminae which may or may not commonly engage the adjacent choke surfaces.

SUMMARY OF THE INVENTION

The present invention provides an apparatus and method for manufacturing and automatically stacking a laminated stack which includes a lamina comprised of a plurality of discrete lamina segments and which may include a plurality of differently configured laminae to thereby produce lamina stacks which may include a plurality of slots and windows separating individual lamina segments. The present invention also provides an apparatus and method for producing long, slender, interlocked lamina stacks wherein the individual laminae have cross-sectional shapes having sides which do not substantially lie in a common plane.

An advantage of the present invention is that it permits the automatic stacking of a laminated stack which includes a lamina layer comprised of discrete lamina segments thereby providing for the economical manufacture of lamina stacks which include a lamina or lamina layer comprising a plurality of discrete lamina segments. For example, linear motors which require stator cores having slots on opposing sides of the core for accommodating supports for an actuator disposed within the stator core may be economically manufactured by the present invention. The ability to automatically stack a lamina comprised of discrete lamina segments also permits the manufacture of a wide variety of laminated stacks for applications beyond electrical motor and stator cores which are uneconomical or impractical to manufacture using laminated stacks which do not include laminae comprising discrete lamina segments.

Another advantage of the present invention is that the economical manufacture of laminated stacks comprising a lamina layer of discrete lamina segments permits the manufacture of parts which were previously stamped from a single thickness stock material. Manufacturing parts from laminae rather than from a single thickness stock material can eliminate secondary operations. For example, notches can be placed in selected laminae prior to stacking to thereby form a notch or opening in the outside edge or wall of the laminated stack which does not extend the entire height of the stack and which, if formed in a part stamped from a single thickness of stock material, would require a secondary machining operation after stamping.

Yet another advantage of the present invention is that it permits the automatic stacking of a laminated stack having a plurality of distinguishable outer perimeter configurations. The need to manually handle and stack laminae to form a lamina stack having a plurality of outer perimeter configurations and/or a lamina layer comprising a plurality of discrete segments is thereby eliminated. The conveyor, pressing and stack securing equipment used in the traditional manual assembly method are also eliminated by the present invention.

Yet another advantage of the present invention is that it permits the automatic stacking of long, thin, flexible laminae into an interlocked stack, the laminae having cross-sectional shapes with sides that may not substantially lie in a common plane.

The invention comprises, in one form thereof, a die assembly for producing a lamina stack including at least one lamina layer which is comprised of a plurality of discrete segments. Strip stock is guided through the die assembly and a plurality of laminae and discrete lamina segments are progressively stamped from the strip stock. The laminae and each of the discrete lamina segments have interlock tabs and/or slots punched therein and remain attached to the strip stock prior to advancement to the blanking station at which the choke barrel is located. At the blanking station, the lamina segments have their interlock tabs engaged with the interlock slots of the uppermost lamina in the choke barrel immediately prior to the complete separation of the lamina segments from the strip stock material thereby maintaining the lamina segments in proper alignment with each other and the laminae which form the remainder of the lamina stack. The choke barrel may also be rotatable whereby the laminae may be rotated to correct for thickness inconsistencies in the strip stock material.

The invention comprises, in another form thereof, a die assembly for producing a lamina stack including at least one lamina which is comprised of a plurality of lamina segments and wherein the laminae forming the stack have more than one predetermined outer perimeter configuration. The die assembly provides for the alignment, interlocking and stacking of the lamina segments as described above and also provides a common choke surface on the outer perimeter of each of the lamina segments so that, when the lamina stack is completed, the resultant stack comprising lamina layers having a plurality of outer perimeters and may have a plurality of common choke surfaces on its outer perimeter which may extend continuously along the exterior edge of each lamina layer in the stack in a direction parallel to the axis of the lamina stack. The laminae are stacked within the choke barrel such that the common choke surfaces are in registry with an alignment surface of the choke barrel.

The invention comprises, in another form thereof, a selectively actuated die assembly for producing a lamina stack formed from laminae which have more than one predetermined outer perimeter configuration. Each of the differing outer perimeter configurations has at least one common choke surface so that, when the laminae are stacked, the resultant stack may have at least one choke surface on its outer perimeter which extends continuously along the exterior edge of each lamina in the stack in a direction parallel to the axis of the lamina stack. The laminae are then stacked in a choke barrel with their common choke surfaces being aligned to create a lamina stack comprised of laminae having a plurality of outer perimeters and at least one choke surface extending continuously in an axial direction across a portion of the outer perimeter of each of the laminae. The choke barrel, which may be rotatable, includes an alignment surface, the common choke surfaces of the laminae being stacked in registry with the alignment surface.

The invention comprises, in another form thereof, a method of manufacturing a lamina stack, having at least one lamina layer formed from a plurality of discrete segments, in a die assembly having a punch and a choke barrel. Strip stock is guided through the die assembly and a plurality of laminae are stamped from the strip stock including at least one lamina which is comprised of at least two discrete segments. The lamina segments are maintained in relative alignment by attachment to the strip stock material as they are advanced through the die assembly. During progression of the discrete segments through the die assembly interlock tabs and slots are stamped into each of the lamina segments. When the lamina segments reach the choke barrel, the interlock tabs of each of the lamina segments are engaged with the uppermost lamina in the choke barrel prior to separating the discrete segments from the strip stock to thereby continuously maintain the proper alignment of the lamina segments relative to each other and the other laminae which form the remainder of the lamina stack.

The invention comprises, in another form thereof, a method of manufacturing a lamina stack in a die assembly having a selectively actuated punch and a choke barrel. Strip stock is guided through the die assembly and a plurality of laminae are stamped from the strip stock by the selectively actuated punch to form laminae having a plurality of outer perimeter configurations. The laminae each have a common choke surface which are aligned as the laminae are formed into a stack in the choke barrel. It is also possible to autorotate the laminae prior to stacking the laminae.

The invention comprises, in another form thereof, a method of manufacturing an elongate laminated stack in a die assembly having means for guiding strip stock material through the die assembly, stamping means and a choke passageway or opening. A first elongate lamina is stamped in the stock material and at least one first interlock means for engaging another lamina is stamped in the first lamina. The first lamina is separated from the stock material and placed into the choke passageway. A second lamina is stamped in the stock material and at least one second interlock means for engaging another lamina is stamped in the second lamina. The first and second interlocking means are at least partially engaged, after which the second lamina is separated from the stock material and placed into the choke passageway. While in the choke passageway, only one of the first and second laminae frictionally engages the choke passageway along its first and second elongate edges.

The invention comprises, in another form thereof, a method of manufacturing an elongate stack of laminae in a die assembly having means for guiding strip stock material through the die assembly, stamping means and a choke passageway. A first lamina is stamped in the stock material and at least one first interlock means for engaging another lamina is stamped in the first lamina. The first lamina is separated from the sheet stock material to yield a first lamina having a first outside perimeter shape having an elongate edge and which is placed into the choke passageway. A second lamina is stamped in the stock material and at least one second interlock means for engaging another lamina is stamped in the second lamina. The first and second interlocking means are at least partially engaged before the second lamina is separated from the stock material. The second lamina is separated from the sheet stock material to yield a second laminar segment having a second outside perimeter shape having an elongate edge and different than the first outside perimeter shape, and is placed into the choke passageway. The elongate edge of only one of the first and second laminae frictionally engages the choke passageway.

The invention comprises, in another form thereof, a method of manufacturing an elongate stack of interlocked laminae in a die assembly having means for guiding strip stock material therethrough, stamping means and a choke passageway or opening. The method includes stamping a first elongated lamina having generally opposed first, second, third, and fourth edges in the strip stock material. At least one first interlock element is also stamped into the first lamina, after which the first lamina is separated from the strip stock material and placed into the choke passageway, the first and second edges of the first lamina frictionally engaging the choke passageway. A second elongate lamina having first, second, third, and fourth edges is stamped in the strip stock material. At least one second interlock element is also stamped in the second lamina and at least partially engaged with the first interlocking element, after which the second lamina is separated from the strip stock material and placed into the choke passageway, the first and second edges of the second lamina frictionally engaging the choke passageway. The choke passageway frictionally engages along the third and fourth edges of only one of the first and second laminae.

The invention comprises, in another form thereof, a die assembly for manufacturing a stack of elongate, slender laminae from strip stock material, which comprises a plurality of punching stations, each punching station having a punch for stamping features in strip stock material. The features define elongate laminae each having generally opposite first and second edges and interlock means for engaging another lamina. Each of the laminae are connected to a carrier portion of the strip stock material. The die assembly further includes aligning means for positioning the strip stock material in the die assembly, and a blanking station having a blanking punch disposed over an elongate choke cavity for separating a lamina from the carrier portion of the strip stock.

The invention comprises, in yet another form thereof, an elongate stack of laminae including at least one first lamina and at least one second lamina, the first lamina being the widest of all laminae in the stack. The second lamina has a width which is less than that of the first lamina. Each lamina in the stack is interlocked to another lamina.

The invention comprises, in still another form thereof, an elongate stack of interlocked laminae including a first elongate, slender, relatively flexible lamina having a first interlock element and first and second generally opposed edges defining the ends of the first lamina in a first direction of the stack. The first lamina also has third and fourth generally opposed edges defining the ends of the first lamina in a second stack direction. The stack also includes a second elongate, slender, relatively flexible lamina having a second interlock element, which is interlocked with the first interlock element, and first and second generally opposed edges defining the ends of the second lamina in the first stack direction. The first edges of the first and second laminae are aligned to define a substantially planar stack surface. The second lamina also has third and fourth generally opposed edges defining the ends thereof in the second stack direction. One of the third and fourth edges of the first lamina are not aligned with the third and fourth edges of the second lamina.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 18 is a schematic view of the sheared edge of a thick material;

FIG. 19 is a schematic view of the sheared edges of a plurality of laminae forming a laminated stack;

FIG. 29 is a schematic cross sectional view of the blanking punch of FIG. 26 separating the lamina from the strip stock material, a completed and a partially completed stack shown in the choke passageway.

Figure 1:
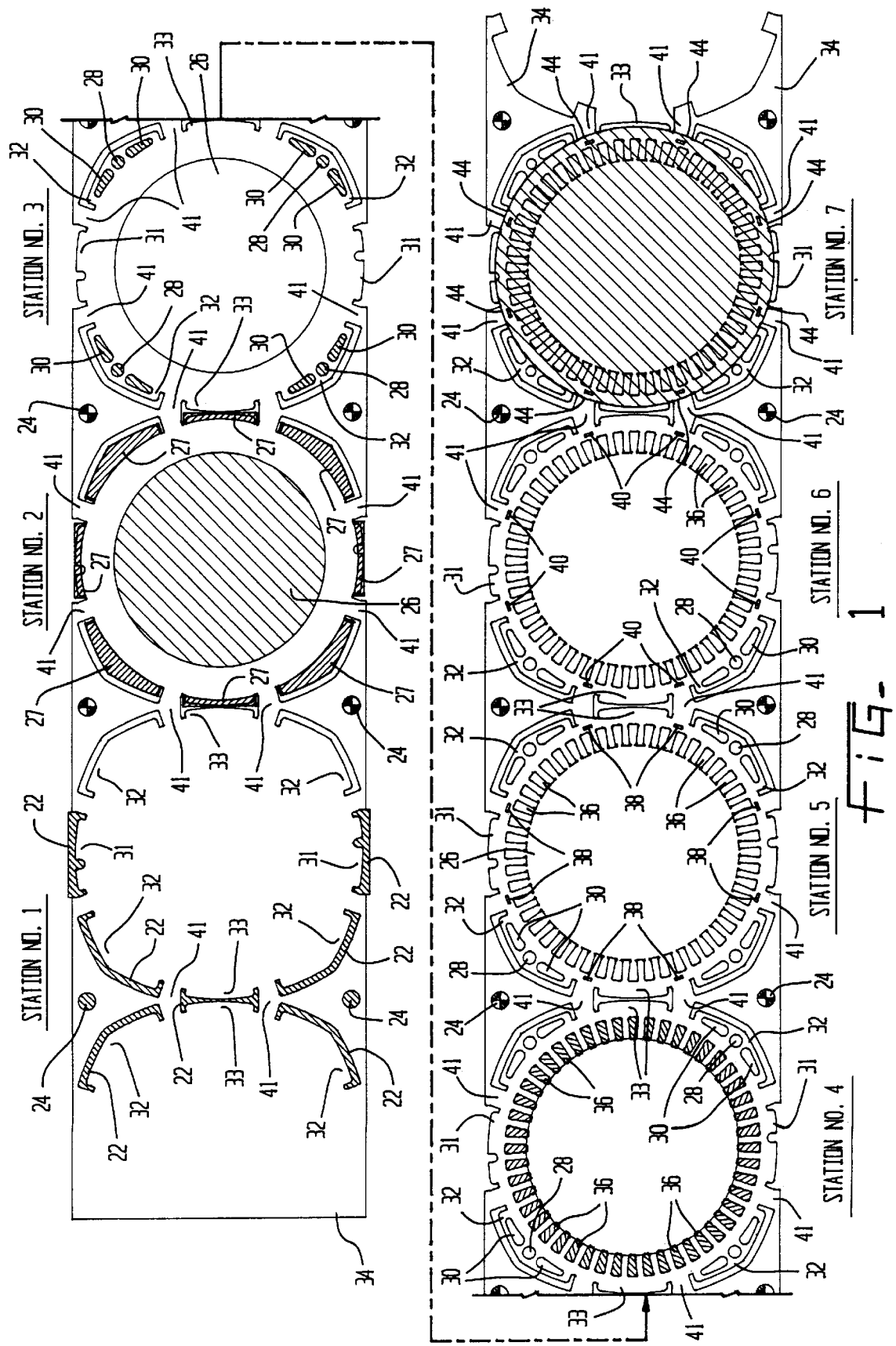
FIG. 1 is a plan view of a first strip layout for producing a stator core having laminae with a plurality of distinguishable outer perimeter configurations.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description.

Figure 2:
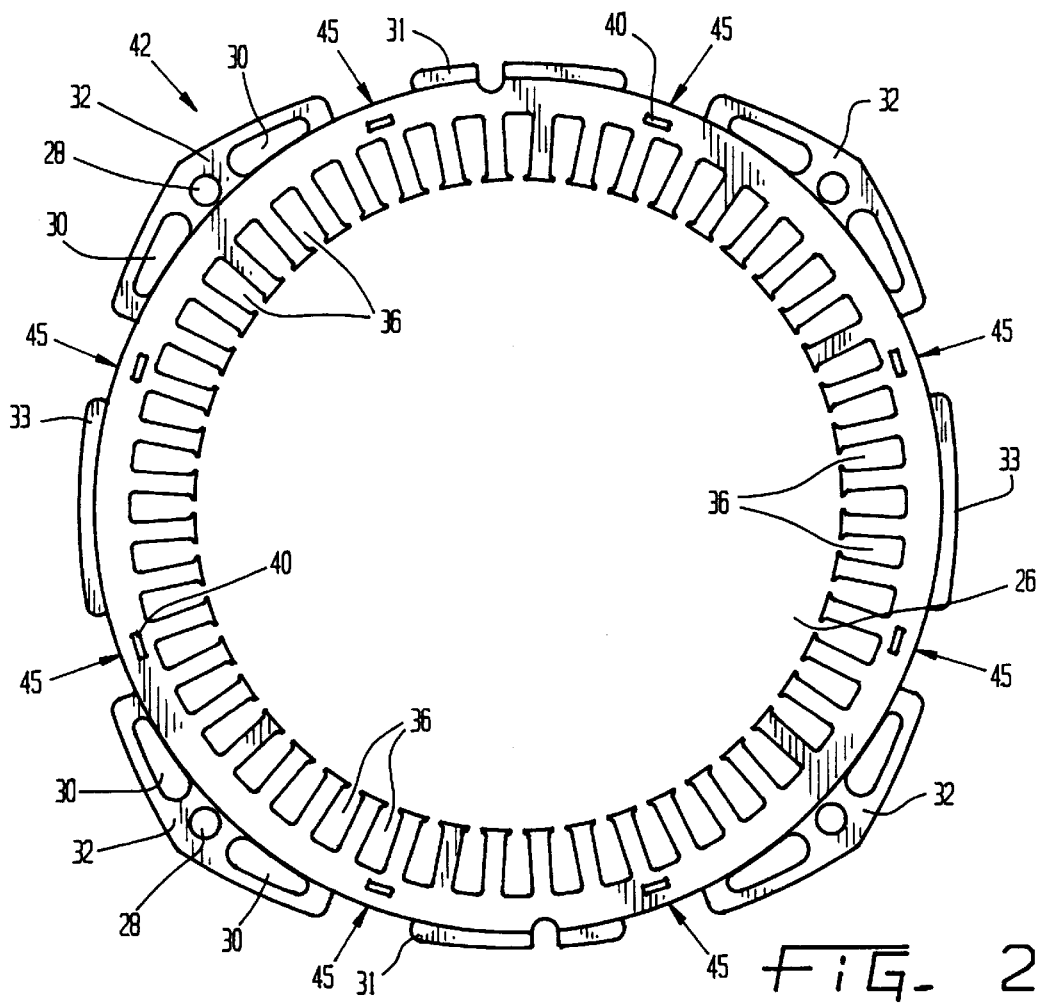
FIG. 2 is a plan view of the stator core created by stacking the laminae produced by the strip layout of FIG. 1.
Figure 3:
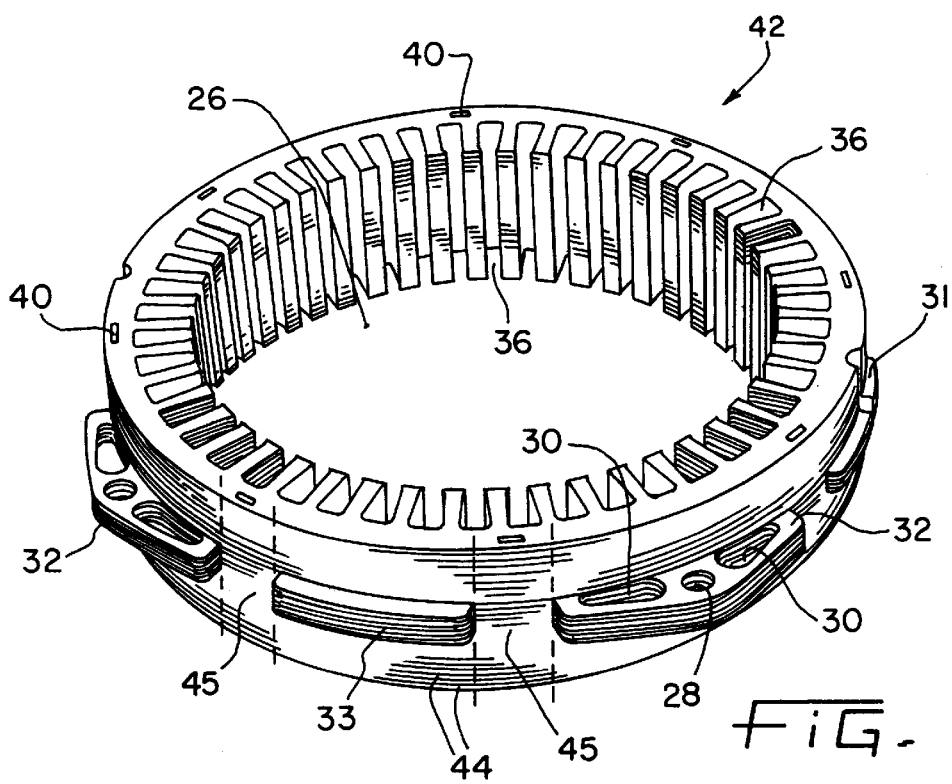
FIG. 3 is a perspective view of the stator core of FIG. 2.

A strip layout showing a stamping progression in accordance with the present invention is shown in FIG. 1. The laminae produced by the strip layout of FIG. 1 are used to produce a stator core having projecting flanges on only some of the laminae within each stator core as shown in FIGS. 2 and 3.

At Station No. 1, slots 22 which define the outer perimeter of projecting flanges for two adjacent laminae are punched. Pilot pin holes 24 used to guide and align strip stock 34 through subsequent stations are also punched at Station No. 1. Flange defining slots 22 are punched for each lamina, even for those laminae which will have the flanges selectively removed at a later station.

Station No. 2 includes a punch which punches stator bore hole 26 in each lamina. In most cases, this station would comprise either a rotor blank out punch or stator bore hole shave punch. Flanges 31, 32 and 33 defined by slots 22 are selectively removed from some of the laminae at Station No. 2 as shown by outline 27 of the selectively actuated flange removal punches.

At Station No. 3, flange bolt holes 28 and flange slots 30 are punched. The strip stock is shown with flanges 31, 32 and 33 at Station Nos. 3–7, however, for laminae which do not have flanges 31, 32 and 33 due to the actuation of the flange removal punches at Station No. 2, the material comprising the flanges would not be present. Thus, the punches at Station No. 3 do not have to be selectively actuated. By limiting the use of selectively actuated dies to only those situations where they are indispensable the cost of the die assembly is minimized.

Stator winding slots 36 for all of the laminae are punched at Station No. 4. The use of a single punch cluster at Station No. 4 to stamp winding slots 36 for each of the laminae produces a winding slot in finished stator core 42 which has fewer discontinuities and sharp edges than a stator core comprised of laminae produced by a plurality of dies.

Station No. 5 is a selectively actuated punch station which is actuated for the bottom lamina of each stator stack. Material 38 removed at Station No. 5 would otherwise be formed into interlock tab 40 at Station No. 6. The punches at Station No. 6 do not have to be selectively actuated because if the punches are always operative they would simply not create any additional interlock features in the bottom laminae formed at Station No. 5.

At Station 7, all of the laminae are blanked from remaining strip stock 34 by severing material bridges 41 and are pressed into a choke barrel. It is not necessary for the punch to engage the entire surface area of flanges 31, 32 and 33. For in the present embodiment the choke barrel is nonrotatable, however, as will be described below, the choke barrel utilized in this embodiment of the present invention may also be rotatable. Material bridges 41 are cut at the same location on both the flanged and unflanged laminae, thereby creating common choke surfaces 44, as shown in FIGS. 1 and 3, on the edge of each lamina.

The choke barrel (shown schematically in FIG. 11) into which the laminae are pressed has alignment surfaces which correspond with and engage each of common choke surfaces 44. The alignment surfaces define an outer perimeter which is equal to or slightly less, e.g., by 0.001 inch, than the outer perimeter defined by common choke surfaces 44 to thereby provide an interference fit engagement with the laminae. This interference fit engagement of each of the laminae maintains the laminae in an aligned position and also resists the movement of the laminae through the choke barrel. This fit provides backpressure which allows subsequent laminae to be pressed into interlocked engagement with the laminae already in the choke barrel.

When the stack has been completed, the individual common choke surfaces 44 of each lamina form stack choke surface 45, shown in FIG. 3, which extends continuously in an axial direction of the stack across a portion of the outer perimeter of each of the laminae which comprise the stack.

Flanged stator core 42 produced by the laminae punched from strip stock 34 of FIG. 1 is shown in FIGS. 2 and 3. A controller is used to selectively actuate the punches at Stations 2 and 5. By actuating the punches of Station Nos. 2 and 5 in a controlled sequence, laminae may be produced in the order necessary to form flanged stator core 42.

Figure 5:
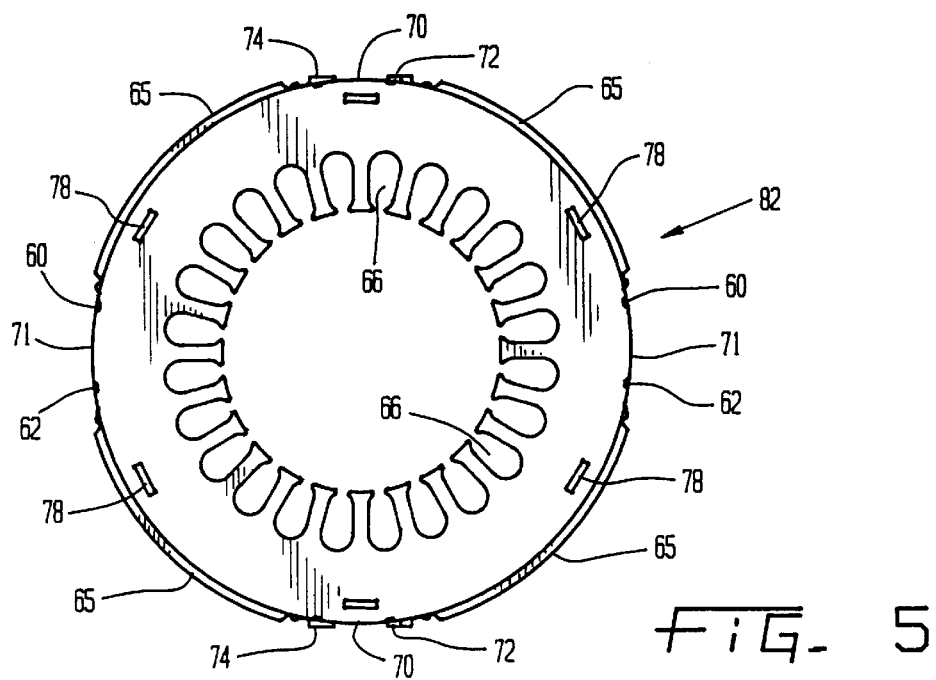
FIG. 5 is a plan view of the stator core produced by stacking the laminae produced by the strip layout of FIG. 4.
Figure 4A:
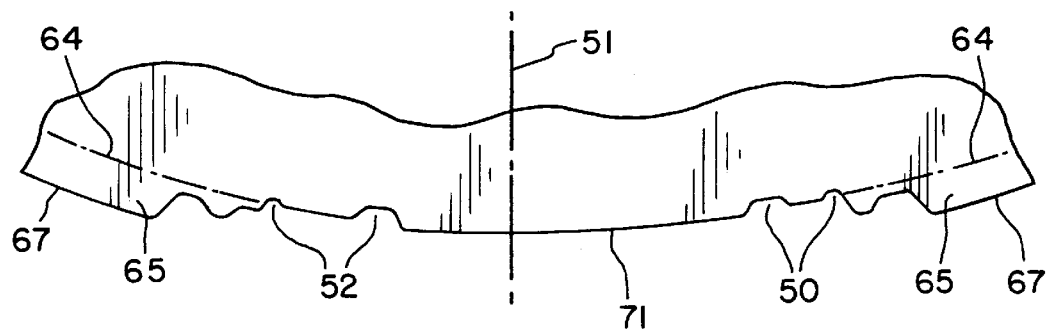
FIG. 4A is an enlarged partial plan view of detail 4A of FIG. 4.
Figure 4B:
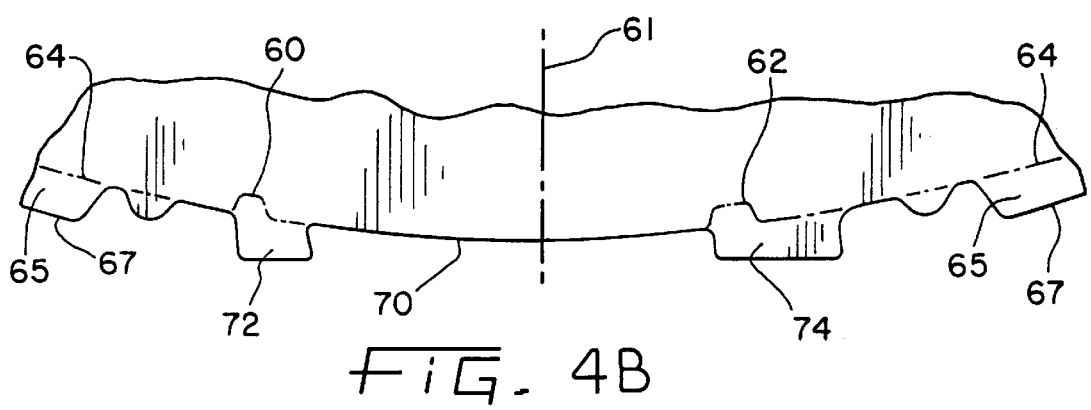
FIG. 4B is an enlarged partial plan view of detail 4B of FIG. 4.
Figure 4:
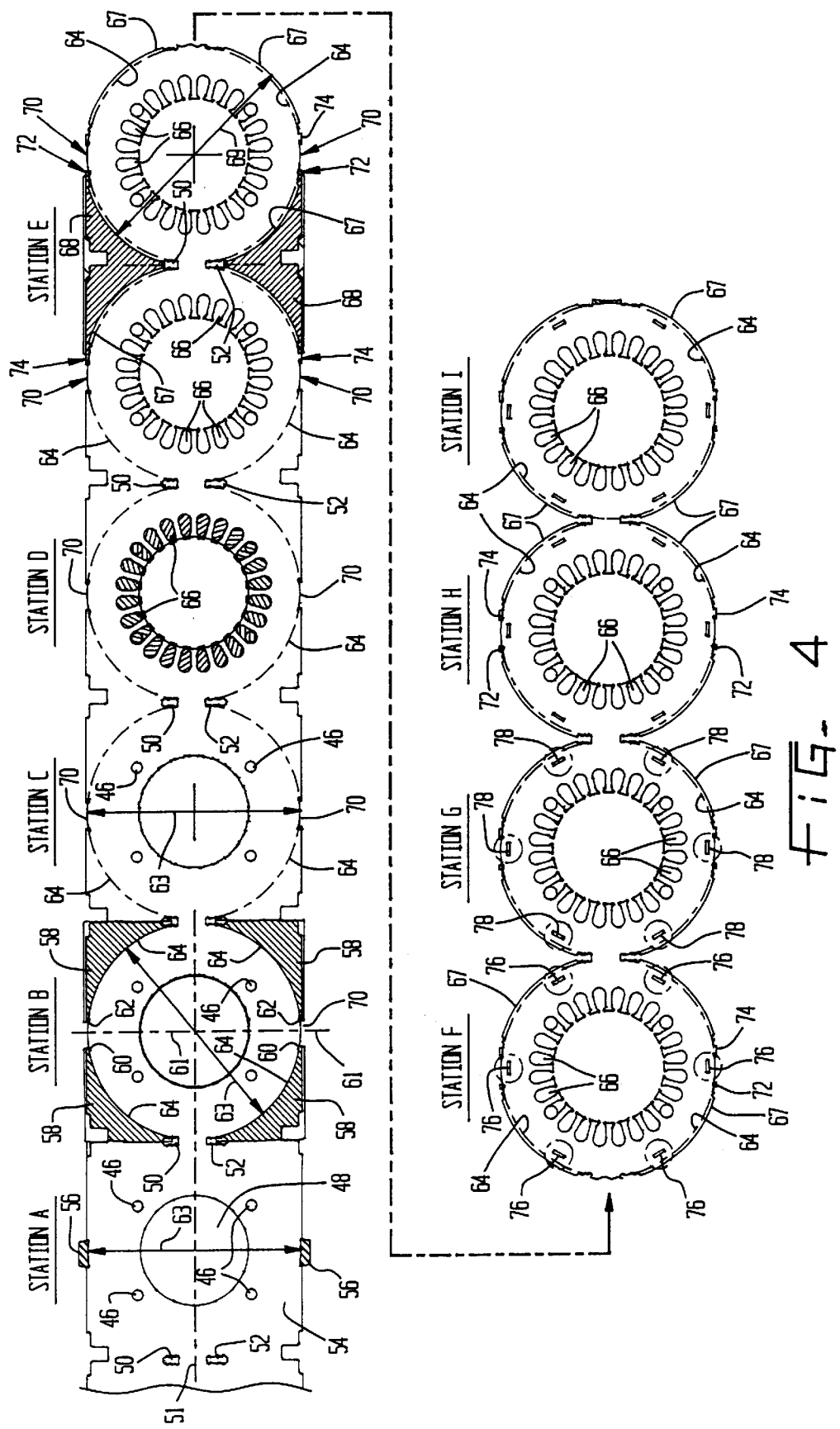
FIG. 4 is a plan view of a second strip layout for producing a stator core having a plurality of distinguishable outer perimeter configurations.
Figure 6:
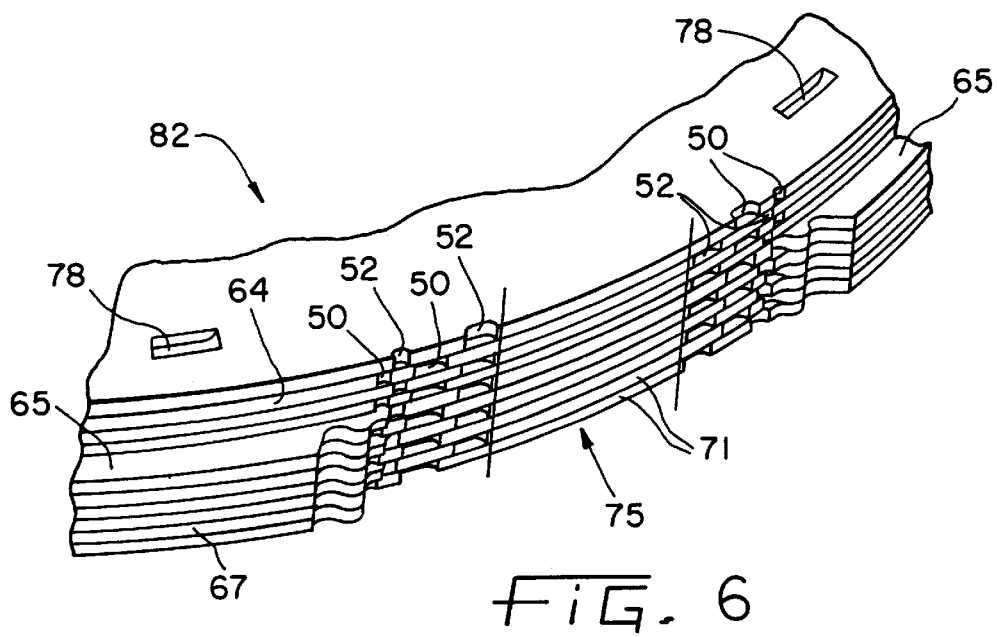
FIG. 6 is a partial perspective view of the stator core of FIG. 5.
Figure 7:
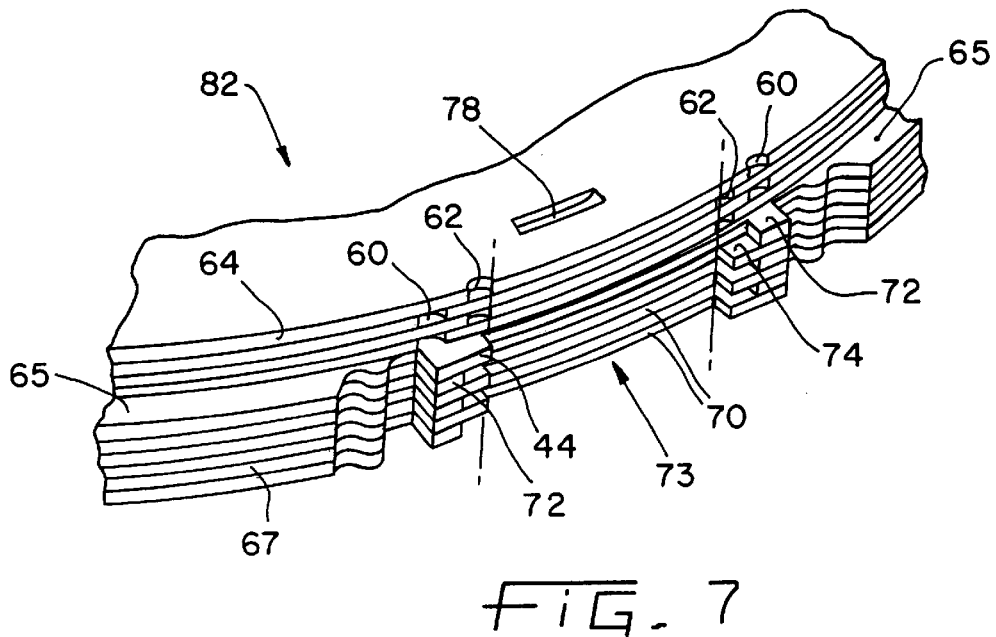
FIG. 7 is another partial perspective view of the stator core of FIG. 5.

A second strip layout showing a stamping progression in accordance with the present invention is shown in FIG. 4. The laminae produced by the strip layout of FIG. 4 are used to produce a stator core having projecting flanges on only some of the laminae within each stator core as shown in FIGS. 5–7. Prior to reaching Station A, pilot pin holes 46, stator bore hole 48, first ribbed slot 50 and second ribbed slot 52 are punched during the production of a rotor lamina which is removed from strip stock 54 prior to Station A.

At Station A, two common choke surfaces comprising a circular portion with a minor diameter 63 are defined by stamping edge slots 56. Edge slots 56 are not perfectly symmetrical about centerline 61 but are slightly offset and extend further to the left as seen in FIG. 4.

Station B is a selectively actuated, or cammed, station at which minor circular perimeter 64 having minor outer diameter 63 is defined by triangular punches 58 for certain laminae. Just inside the edges of common choke surfaces 70 defined at Station A, first and second rounded corners 60 and 62 project inwardly on the punches and thereby cut common choke surfaces 70 at a roughly 90° angle and avoid the difficulties which can arise when attempting to feather a cut into a preexisting edge.

First and second ribbed slots 50 and 52 also have similar rounded corners to allow for a cleaner cut. Second ribbed slot 52 is closer to centerline 51 than first ribbed slot 50; and rounded corners 62 are closer to centerline 61 than rounded corners 60 as further explained herein below.

Station C is idle and minor circular perimeter 64 is shown in dashed outline. The material outside minor perimeter 64 would not be present for those laminae which were stamped by the selectively actuated die at Station B.

Winding slots 66 are stamped at Station D for all of the laminae. At Station E major outside perimeter 67, having major diameter 69, is punched by means of two punches 68 which form an hourglass shape. Station E does not have to be selectively actuated and removes no material for those laminae which have already had a minor perimeter defined at Station B. Hourglass shaped punches 68 do not intersect common choke surface 70 on the edge of each lamina but instead leave short and long locator ribs 72 and 74, respectively.

Figure 8:
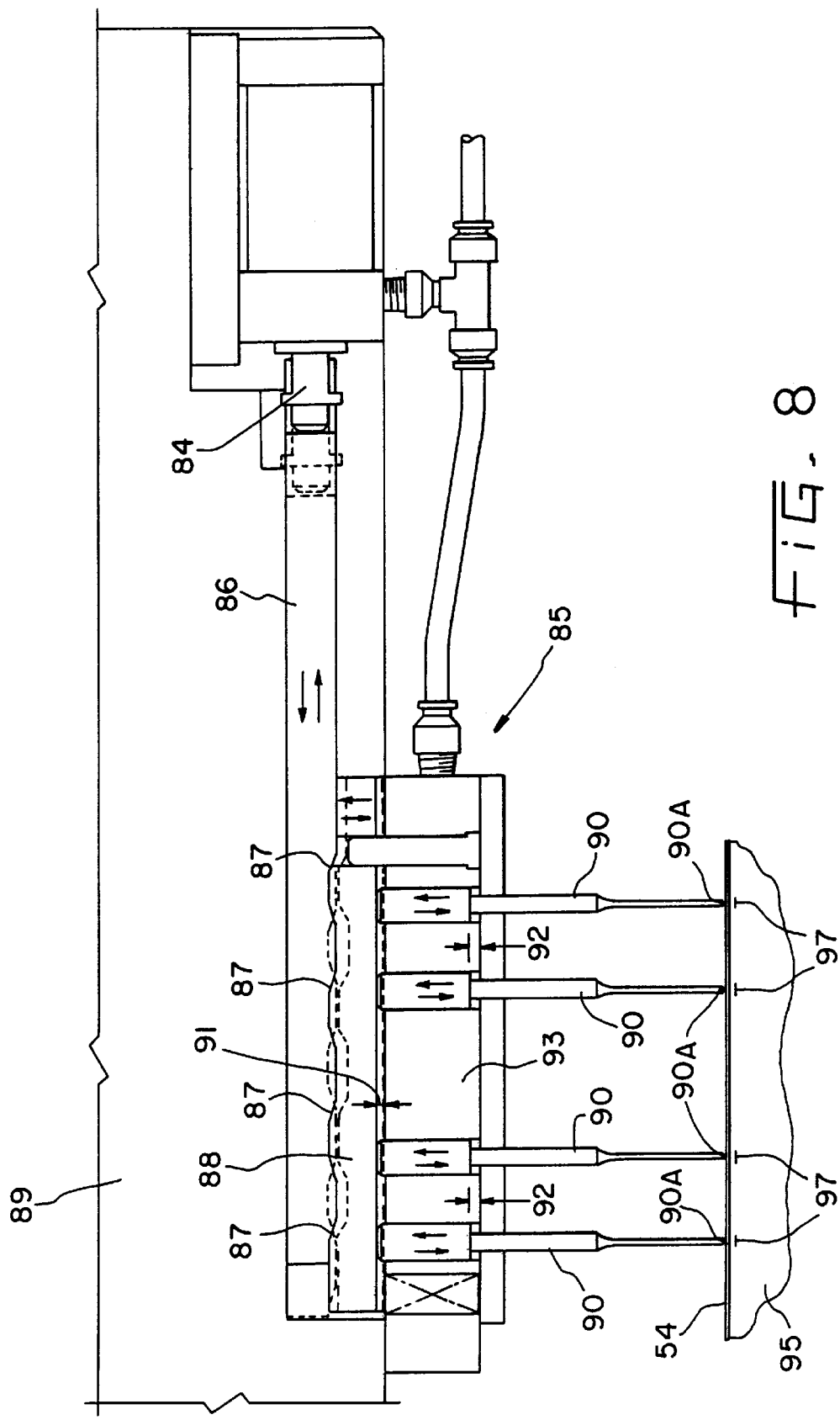
FIG. 8 is an elevational view of the camming arrangement of a selectively actuated die for manufacturing laminae with a plurality of outer perimeter configurations.

Station F is selectively actuated and punches tab receiving slot 76 in those laminae which will form the bottom lamina of each lamina stack 82. A partial cross-sectional view of Station F is shown in FIG. 8 and illustrates the operation of selectively actuated punch 85. Piston 84 is used to control the position of first camming bar 86 which reciprocates in the horizontal direction to thereby move camming bar 88 in a vertical direction due to the interaction of camming surfaces 87. When camming bars 86 and 88 are in the positions shown in solid lines, die punches 90 are positioned as shown in FIG. 8. When in this position, die punches 90 do not remove material from the strip stock. Die punches 90 are allowed to reciprocate vertically with respect to punch block 93 as well as move vertically as a unit with upper die assembly 89.

When piston 84 moves first camming bar 86 into the position shown in dotted outline in FIG. 8, second camming bar 88 is moved into the position shown by the dotted outline in FIG. 8 due to the interaction of camming surfaces 87. In this actuated position second camming bar 88 is moved downward a short vertical distance 91 and thereby forces punches 90 to reciprocate downward distance 92 with respect to punch block 93 and into an actuated position. Upper die assembly 89 is shown in its lowermost position with respect to die bed 95 in FIG. 8. As seen in FIG. 8, punch tips 90A do not punch strip stock 54 during operation of the die when punches 90 are not in an actuated position. When actuated, punch tips 90A reach a lowermost position at lines 97 within a cooperating aperture (not shown) in die bed 95 when upper die assembly 89 is moved downward as a unit. Thus, punches 90 create tab receiving slots 76 in strip stock 54 during operation of the die with the punches actuated but do not create tab receiving slots 76 during operation of the die when the punches are not actuated. Other cammed or selectively actuated stations operate in a similar manner. A center interlock may be alternatively used such as described in U.S. patent application Ser. No. 07/966,876 filed Oct. 26, 1992, assigned to the assignee of the present invention, the disclosure of which is expressly incorporated herein by reference.

At Station G, shown in FIG. 4, interlock tabs 78 are punched. Station H is idle, and at Station I the laminae are punched into rotatable choke barrel 94 (not shown in FIG. 4). Small carrier strip 80 is cut from one end of the lamina defining common choke surface 71 (shown in FIGS. 4 and 6) and, on the opposing side of the lamina, another common choke surface 71 is defined along dashed line 81 where the lamina is cut from the strip stock. Carrier strip 80 interconnects the laminae and allows the laminae to be transported as a strip between stations before they are blanked into the choke barrel. Other well known means may also be used; such as pushback designs, which are generally impractical for stator cores because of the increased strip width which is required; and semi-scrapless designs, in which only a single cut, severing the lamina from the strip stock, is made at the last station.

Figure 9:
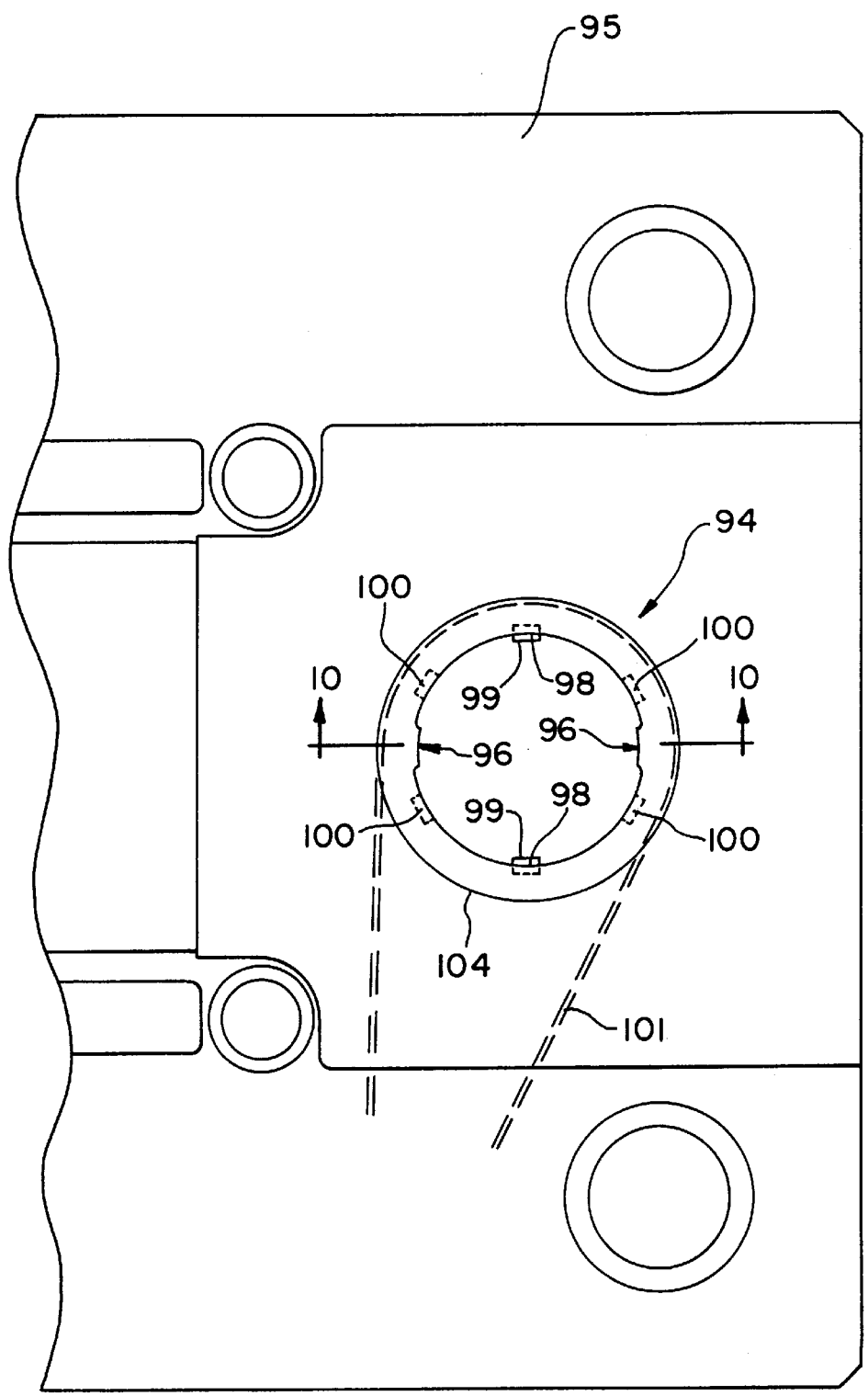
FIG. 9 is a partial plan view of a die with a rotatable choke barrel having alignment surfaces.
Figure 10:
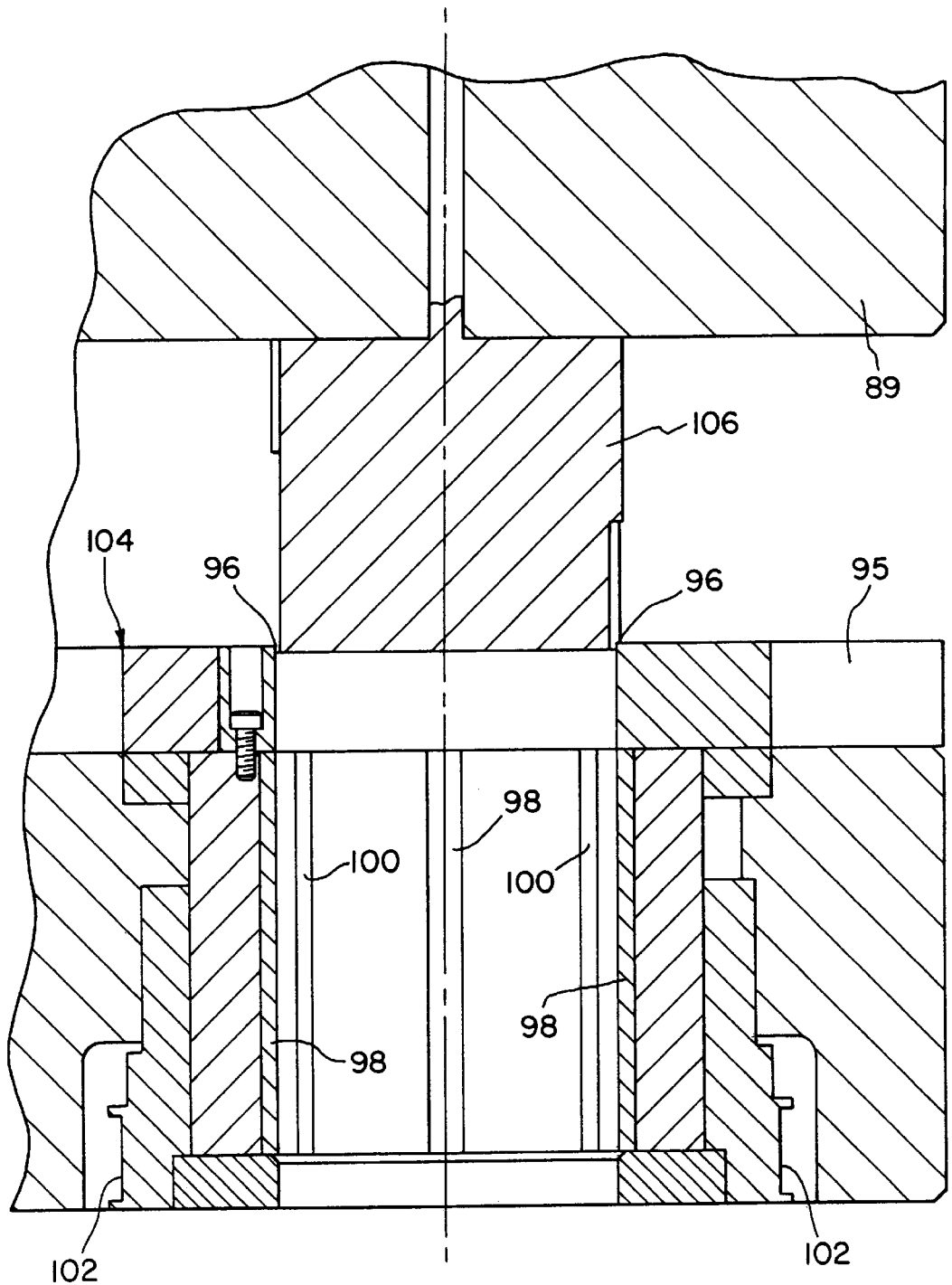
FIG. 10 is a cross-sectional view taken along line 10—10 of FIG. 9.

Rotatable choke barrel 94 is shown in FIGS. 9 and 10. Common choke surfaces 71, shown in FIG. 6, are defined by cutting edges 96. Carbide inserts 98 having aligning surfaces which engage common choke surfaces 70 of each of the laminae project into the interior of choke barrel 94. Similar carbide inserts are located below cutting edges 96 and engage common choke surfaces 71 of each of the laminae. Carbide inserts 100 engage the outer perimeter surface of only those laminae having a major outside diameter.

A servo drive system, mechanical indexer or other means rotates choke barrel 94 by means of belt 101. The belt, not shown in FIG. 10, is located in recess 102. Rotating choke barrel 94 engages die bed 95 at surface 104. Punch 106, shown in FIG. 10, presses the individual laminae into interlocked engagement with the laminae which are already within the choke barrel for those laminae which have interlock tabs. The rotation of choke rings is known in the art, as shown for example, by U.S. Pat. No. 5,377,115 assigned to the assignee of the present invention, the disclosure of which is expressly incorporated herein by reference.

Choke barrel 94 may be rotated between each operation of the die assembly, for example, by 180° for producing lamina stack 82. Accurate rotation of the laminae is important to maintain vertical registry of winding slots 66. The rotation serves several purposes: First, it corrects for thickness inconsistencies in the strip stock. Second, it prevents ribbed slots 50 and 52 and indentations 60 and 62 from being aligned. The non-aligned slots and indentations are shown in FIGS. 6 and 7. This allows a cup-shaped endshield to be force-fit over the end laminae having a minor outside perimeter 64 and to abut shoulder 65 formed by the laminae having major outside perimeter 67. The endshield thereby hermetically seals the interior of the stator core. The hermetic seal would not be possible if the laminae were not rotated to prevent alignment of ribbed slots 50 and 52 and rounded corners 60 and 62 on the laminae having minor outside perimeter 64. Providing a hermetically sealed endshield allows a motor which incorporates stator core 82 to be safely used in environments where flammable vapors are present. Although, the disclosed embodiment rotates each lamina 180° with respect to the previous lamina, other angles and counts (or frequencies) of autorotation may also be used.

The individual common choke surfaces 70 and 71 disposed on the outer perimeter of each lamina form choke surfaces 73 and 75, respectively, which extend continuously in an axial direction of the stack across a portion of the outer perimeter of each of the laminae which comprise stator stack 82 as illustrated in FIGS. 6 and 7. Common choke surfaces 70 and 71 are pressed into engaging contact with aligning surfaces 99 of carbide inserts 98 when the laminae are blanked into rotatable choke barrel 94.

Figure 11:
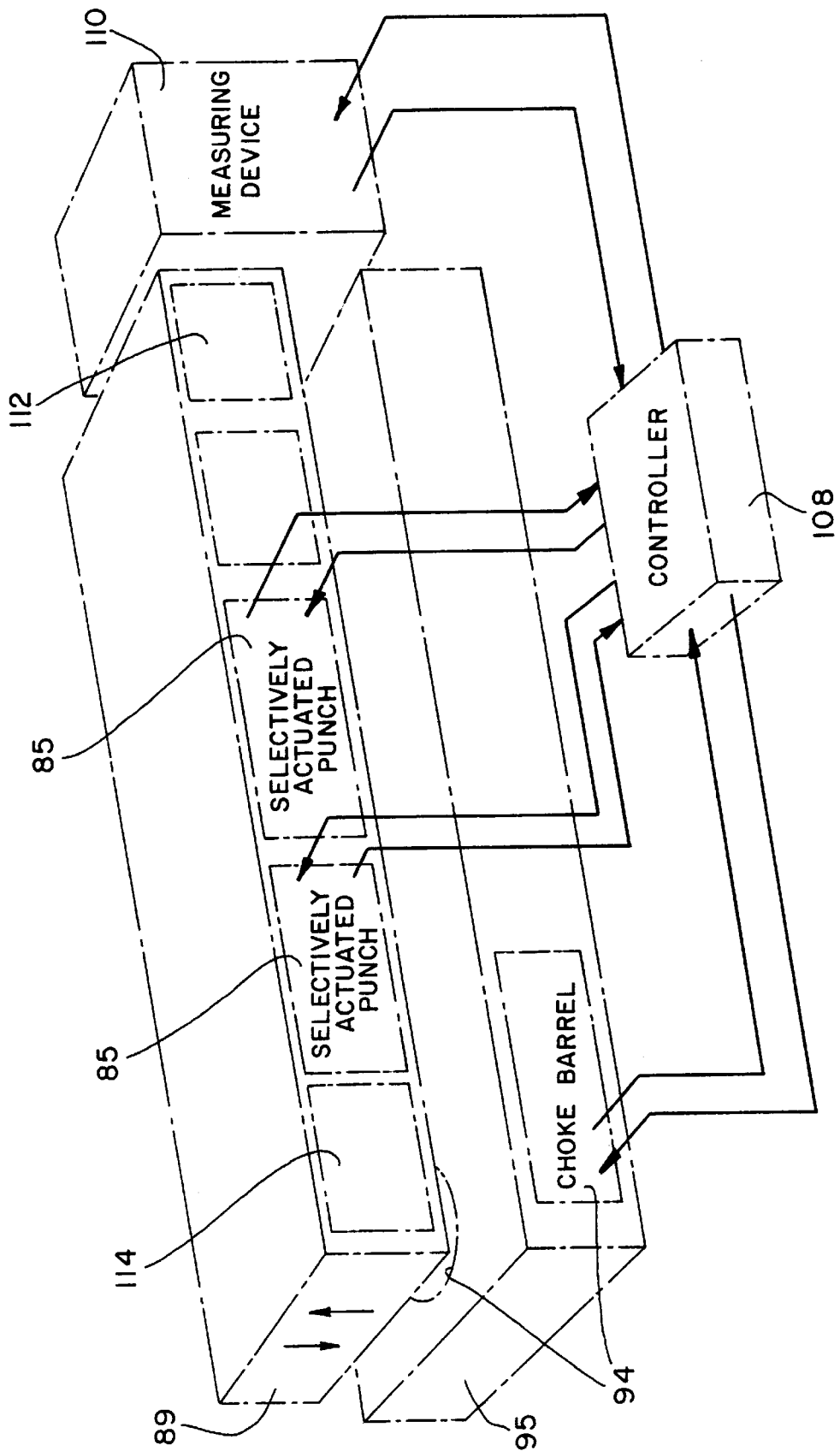
FIG. 11 is a schematic illustration of the interconnections between a die controller, a measuring device, and a die with a rotatable choke barrel.

FIG. 11 provides a schematic illustration of the die assemblies used to manufacture lamina stacks 42 and 82. In FIG. 11, initial station 112 corresponds to Station No. 1 and Station A for the embodiments described above, and to Station No. I for the embodiment discussed below with regard to FIG. 22, while final or blanking station 114 corresponds to Station No. 7, Station I (above-described embodiments) and Station No. VI (below-described embodiment). FIG. 11 also includes schematic representations of selectively actuated punch stations 85 which correspond to Stations 2 and 5, and B and F, discussed above, FIG. 11 does not, however, include representations of each of the remaining stations. Choke barrel 94 can be either stationary or rotatable and does not require a communications link with controller 108 in all embodiments of the invention.

Controller 108 is used to control selectively actuated punches 85 and may be used to control the autorotation of choke barrel 94 or passageway 272, which is discussed further below. Choke barrel 94 or passageway 272 may also be stationary or employ a mechanical indexer, in which case controller 108 would not need to be linked thereto. The controller can be programmed to produce laminae in the alignment necessary to produce the desired stator cores. It is also possible, but not required, to employ measuring device 110, shown schematically in FIG. 11, to determine the thickness of the sheet stock at one or more points along its width. The measured thickness values would be transmitted to controller 108. Controller 108 would then be used to calculate the number of laminae which are required to achieve the desired height of the lamina stack, preferably by calculating the number of laminae required for each stack segment having a particular outside perimeter configuration.

Instead of measuring the strip stock at two different locations along its width and using a measured strip stock thickness inconsistency to calculate the amount of rotation required, the irregularities present in the strip stock can be evenly distributed about the lamina stack axis by rotating all of the laminae a predetermined amount without explicitly calculating the thickness inconsistency.

Autorotation of laminae to correct for thickness variations is known in the art and one such method is disclosed in U.S. Pat. No. 5,359,763 assigned to the assignee of the present invention, the disclosure of which is expressly incorporated herein by reference. Control of the stack height can also involve the use of a coreweighing system as disclosed in U.S. Pat. No. 5,365,021 assigned to the assignee of the present invention, the disclosure of which is expressly incorporated herein by reference.

Figure 12:
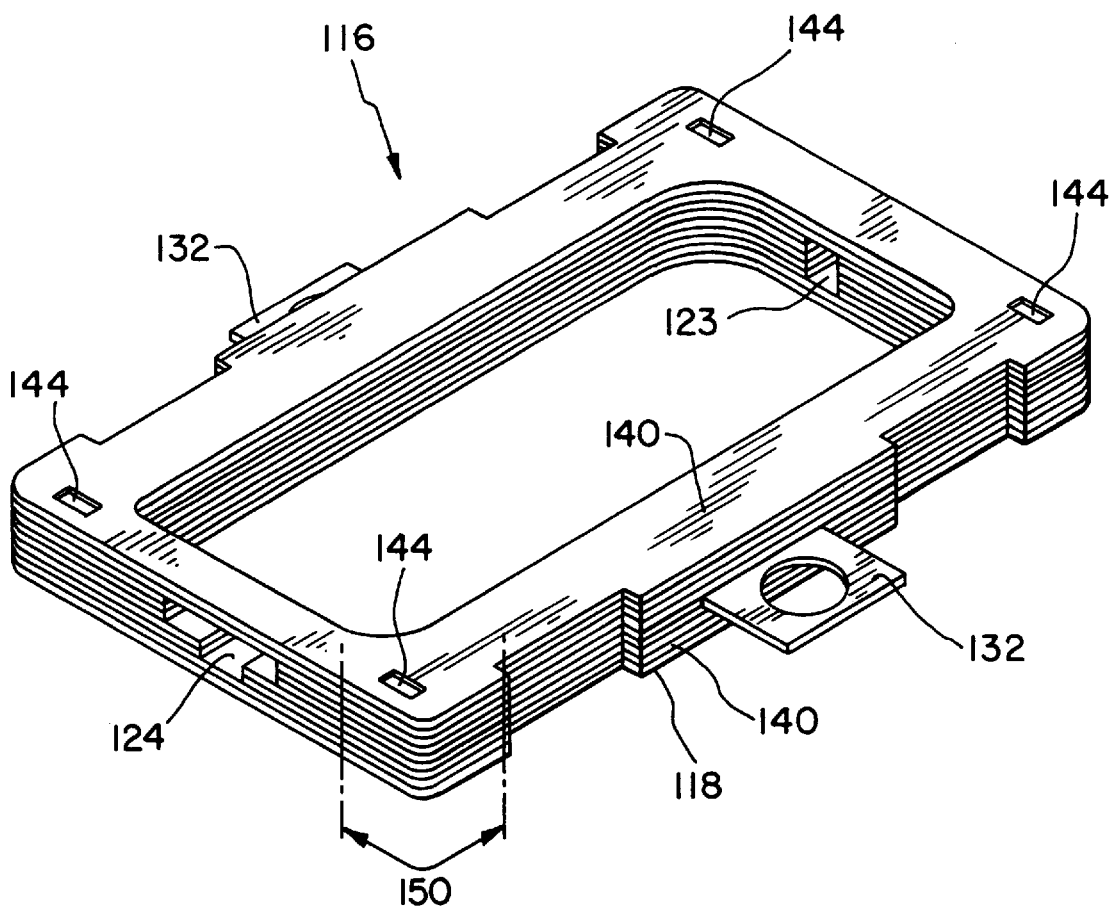
FIG. 12 is perspective view of a lamina stack which includes lamina layers comprised of a plurality of discrete segments.

In accordance with another embodiment of the present invention, FIG. 12 illustrates lamina stack 116 having laminae with a plurality of outer perimeter configurations and which includes several laminae or lamina layers which are comprised of a plurality of discrete lamina segments. The individual lamina layers which are used to form lamina stack 116 are illustrated in FIGS. 13A–13E.

Figure 13A:
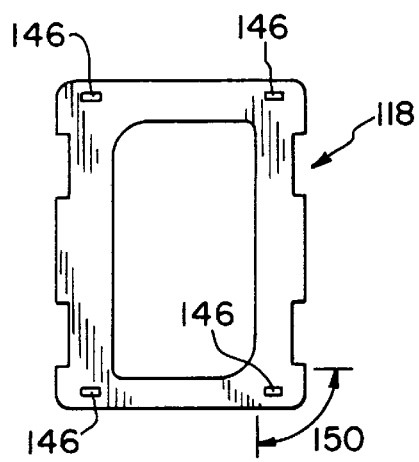
FIG. 13A is a plan view of a lamina forming a portion of the lamina stack of FIG. 12.
Figure 13B:
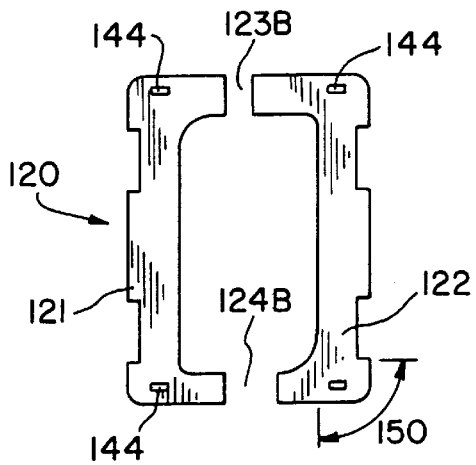
FIG. 13B is a plan view of a lamina forming a portion of the lamina stack of FIG. 12 and which is comprised of a plurality of discrete lamina segments.
Figure 13C:
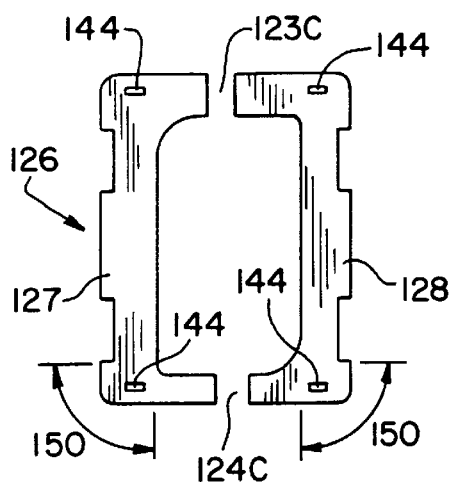
FIG. 13C is a plan view of a lamina forming a portion of the lamina stack of FIG. 12 and which is comprised of a plurality of discrete lamina segments.
Figure 13D:
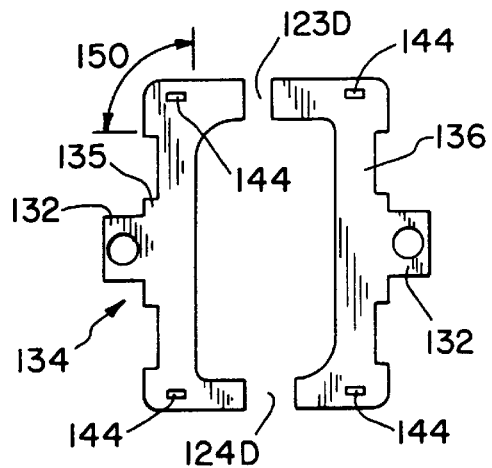
FIG. 13D is a plan view of a lamina forming a portion of the lamina stack of FIG. 12 and which is comprised of a plurality of discrete lamina segments.
Figure 13E:
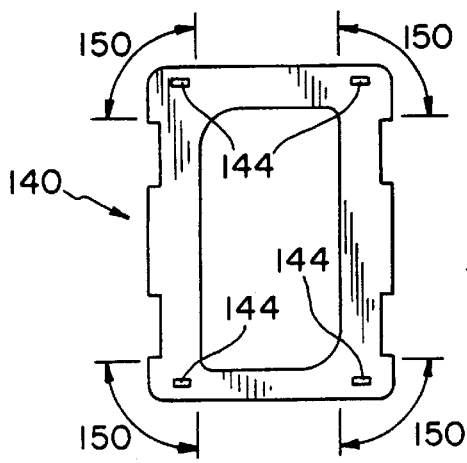
FIG. 13E is a plan view of a lamina forming a portion of the lamina stack of FIG. 12.

Lamina 118 is shown in FIG. 13A and has a continuous and unbroken outer perimeter. Lamina 118 has its interlock tabs 144 completely removed thereby leaving only interlock slots 146 and forming bottom lamina 118 of stack 116 which will not interlock with a lamina stack positioned immediately below bottom lamina 118 in choke barrel 148. Lamina 120, shown in FIG. 13B, is comprised of discrete lamina segments 121 and 122, and has an outer perimeter configuration which defines openings 123B and 124B. Lamina 126, shown in FIG. 13C, is comprised of discrete lamina segments 127 and 128, and has an outer perimeter which defines openings 123C and 124C. Lamina 134, shown in FIG. 13D, is comprised of discrete lamina components 135 and 136, and has an outer perimeter configuration which defines openings 123D and 124D. Lamina 134 also includes projecting flanges 132. Lamina 140 is shown in FIG. 13E and has interlock tabs 144 but is otherwise similar to lamina 118. The "recipe" for lamina stack 116 from bottom lamina through final lamina is lamina 118, lamina 140, lamina 126, lamina 126, lamina 134, lamina 120, lamina 120, lamina 140, and lamina 140.

The various features, including interlock tabs, of laminae 118, 120, 126, 134, 140 are formed by progressively stamping a length of strip stock material by actuating punches in a controlled sequence in a manner similar to that described above for forming the laminae of stacks 42 and 82. After laminae 118, 120, 126, 134 and 140 have been stacked to form lamina stack 116, individual lamina openings 123B, 123C and 123D are aligned and form opening 123. Likewise, individual lamina openings 124B, 124C and 124D form opening 124 in the opposite side of lamina stack 116.

The bottom lamina 118 is followed by a lamina 140 which has interlock tabs 144 formed therein which engage bottom lamina 118 and leave corresponding interlock slots 146 for engagement by the interlock tabs of the upper adjacent lamina. The remaining discrete lamina components 121, 122, 127, 128, 135 and 136 each have interlock tabs 144 and slots 146 formed therein.

Lamina stack 116 includes laminae which define a plurality of outer perimeter configurations and which utilize common choke surfaces 150. Common choke surfaces 150 are located on the corners of each of the laminae and lamina segments. The locations of common choke surfaces 150 are shown in FIG. 13E. Common choke surfaces 150 are also shown in the perspective view of FIG. 12. The interior of choke barrel 148 includes alignment surfaces which engage common choke surfaces 150 of each of the laminae and lamina segments which comprise lamina stack 116 to maintain the laminae in an aligned position and resist the downward movement of the lamina stack through the choke barrel. Resistance to downward movement in the choke barrel provides the back pressure necessary to engage the interlock tabs of the laminae when a lamina is pressed into engagement with a partially formed stack in choke barrel 148.

Choke barrel 148 is a steel choke barrel with the alignment surfaces formed integrally with the remaining interior surface of choke barrel 148. Alternatively, carbide inserts could be used to form the alignment surfaces. The remaining interior surface of choke barrel 148 is configured to allow all of the lamina configurations used to form stack 116 to enter choke barrel 148. The remaining portion of the choke barrel interior surface is configured so that the only engagement of choke barrel 148 with the individual lamina layers occurs at the alignment surfaces, in other words, the interior of the choke barrel, except for at the alignment surfaces, does not conform to the outer perimeter of any of the laminae. Alternatively, the remaining portion of the choke barrel interior surface could engage portions of the laminae along portions of the "larger" outer perimeters at locations other than the alignment surfaces.

The alignment surfaces of choke barrel 148 provide an interference fit with the laminae used to form stack 116. Excessively tight interference fits are undesirable because they can lead to a bowing of the individual laminae which are pressed into the choke barrel. The use of discrete lamina segments to form an individual lamina layer, such as laminae 120, 126 and 134 in stack 116, may increase the susceptibility of a lamina layer to undesirable bowing and distortion. The geometric configuration of the individual laminae and lamina segments and the physical properties of strip stock material 154 are both factors in determining the susceptibility of a lamina layer to undesirable bowing or distortion.

To minimize the risk of undesirable bowing, the alignment surfaces of choke barrel 148 utilize a relatively light interference fit which exerts a reduced pressure on each individual lamina but which develops back pressure over a relatively greater vertical depth 152 to thereby provide an adequate total back pressure for engagement of interlock tabs 144. For example, in an application wherein a conventional interference fit might involve a 0.001 inch interference fit and a choke depth of 1.25 inches, the present application might utilize a 0.0002 to 0.0005 inch interference fit and a choke depth of 3 inches. Resistance to downward movement within the choke barrel is needed to facilitate the engagement of interlock tabs 144 of the lamina being blanked with interlock slots 146 of the uppermost lamina in the choke barrel. The pressure exerted on the individual laminae not only provides resistance to downward motion through the choke barrel but also helps maintain the laminae in proper alignment.

Due to the relatively short height of lamina stack 116, i.e., nine laminae, the compounding of the thickness inconsistencies of the individual laminae is not likely to create significant variances in the final dimensions of lamina stack 116. Thus, illustrated choke barrel 148 is non-rotatable. However, alternative embodiments could utilize a rotatable choke barrel.

The stacking of a plurality discrete lamina segments to form a single lamina layer is schematically illustrated in FIGS. 14–17. FIGS. 14–17 sequentially illustrate the blanking station, at which discrete lamina segments 127, 128 are automatically stacked within choke barrel 148, during a single die stroke.

The laminae and lamina segments which comprise lamina stack 116 are formed by stamping various features in strip stock material 154 as it progresses through the die assembly prior to reaching the blanking station illustrated in FIGS. 14–17. The laminae and lamina segments are attached to the strip stock material through strip stock material bridges which are severed by blanking punch 156. Strip stock material includes pilot pin holes 158 which form apertures in the carrier portion of the strip stock material, i.e., that portion of strip stock material which is not used to form laminae. Pilot pin holes 158 are used to maintain the strip stock material in a desired position relative to the die stations as it is stamped during its advancement through the die assembly. As can be seen in FIGS. 14–17, pilot pin 160 passes through pilot pin hole 158 and enters guide bore 162 to properly locate strip stock material 154 and the laminae and lamina segments which are attached thereto by the sheet stock material bridges relative to the blanking station prior to stamping strip stock material 154. Although only one pilot pin 160 is illustrated, pilot pins are located adjacent each punching station of the die assembly to maintain strip stock material 154 in proper alignment during stamping operations.

Figure 14:
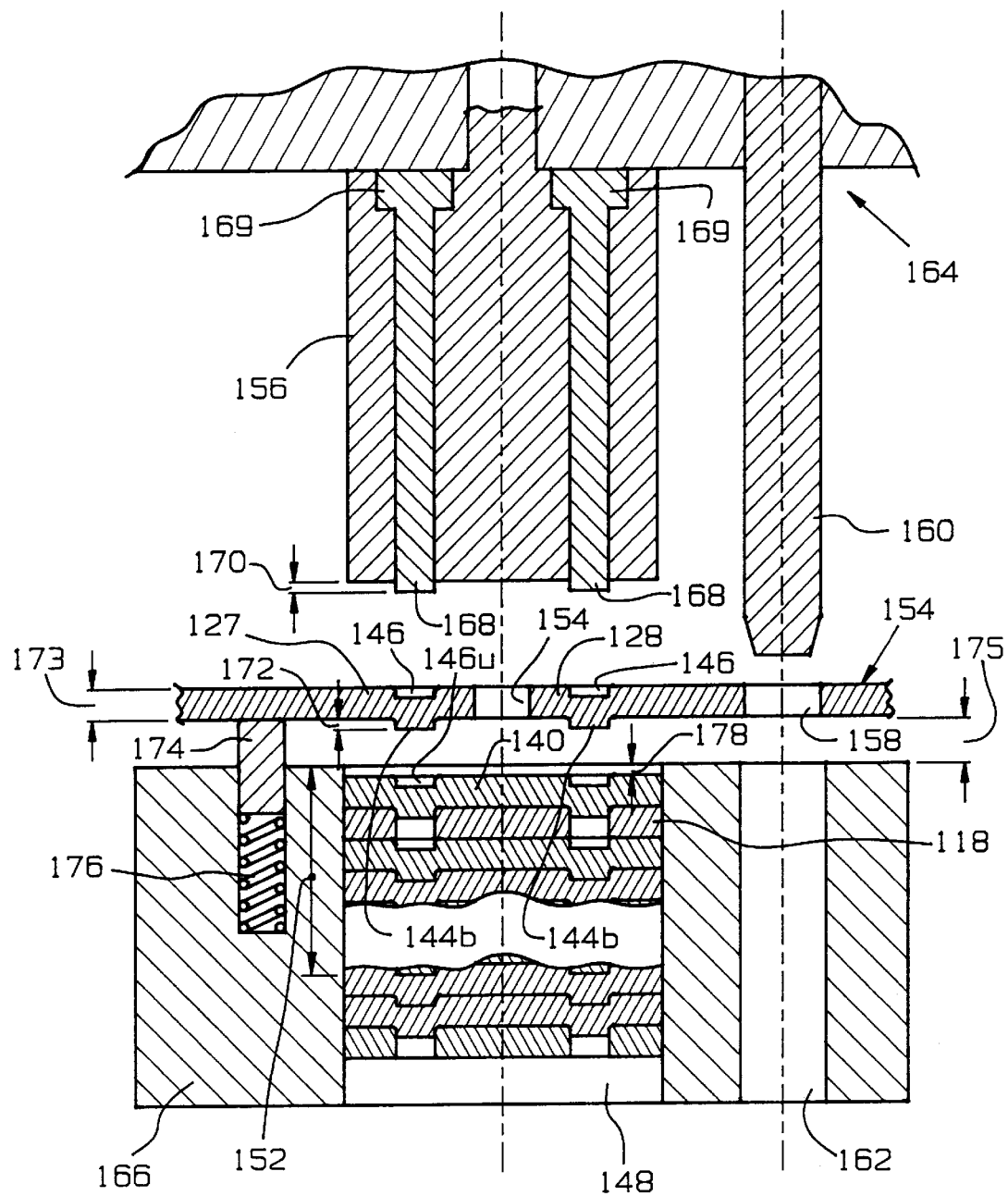
FIG. 14 is a schematic cross sectional view of a die assembly at a blanking station at the beginning of a stamping stroke.

FIG. 14 schematically illustrates a portion of upper die assembly 164 and lower die bed 166. Upper die assembly 164 reciprocates vertically, together with pilot pin 160 and blanking punch 156, to stamp the laminae. Blanking punch 156 severs the material bridges connecting the laminae to the remainder of strip stock material 154. Blanking punch 156 also pushes the laminae into engagement with the uppermost lamina layer disposed in choke barrel 148.

Blanking punch 156 includes staking punch inserts 168 which extend below the bottom surface of the blanking punch by a distance designated 170 in FIG. 14. Staking punches 168 correspond to the location of interlock tabs 144 and enter lamina slot 146 of the lamina or lamina segments being blanked from strip stock 154 and positively engage the respective lamina tabs 144b of the lamina being blanked with the respective interlock slots 146u of the uppermost lamina layer disposed in choke barrel 148.

Staking punches 168 are held in a fixed position relative to blanking punch 156 and each includes head 169 which is seated in a counterbore in blanking punch 156. A grind collar (not shown) may be located below head 169 to permit the lowering of staking punch 168 relative to blanking punch 156. Lowering of the staking punch might be necessary due to chipping or wear of staking punch 168 or to accommodate different interlock tab depths.

A number of different interlock tab designs are known in the art and the tab design will influence the selection of the appropriate tab depth. In one design, three of four sides of a tab are severed from the remainder of the lamina and the tab may be distended below the bottom surface of the lamina by a relatively large distance. In the illustrated embodiment, lamina stack 116 utilizes an alternative design in which no portion of interlock tab 144 is completely severed from the surrounding lamina material. Instead, interlock tab 144 is partially blanked from the surrounding material, deforming, but not severing, the material at the edges of interlock tab 144. Tabs 144 extend below the bottom of the remainder of the lamina by approximately ½ to ⅓ the thickness of the lamina layer. Alternative embodiments of the present invention may employ alternative interlock styles or have the interlock tabs extend a greater or less distance below the remainder of the lamina.

The thickness of the lamina is designated 173 in FIG. 14. The distance by which tab 144 extends below the lower lamina surface is designated 172 in FIG. 14 and is equivalent to distance 170 staking punch 168 extends below blanking punch 156 and is approximately one half of thickness 173. The length designations shown in FIG. 14 are included merely to provide a convenient mechanism for graphically identifying the lengths and spatial relationships discussed herein and are not necessarily to scale.

As discussed above, staking punches 168 are used to ensure engagement of interlock tabs 144 into interlock slots 146 and to prevent interlock tabs 144 from being forced upwardly into the horizontal plane of the remainder of the lamina when tab 144 engages the uppermost lamina in choke barrel 148. Staking punches 168 extend a distance 170 below the blanking punch 156. Distance 170 is equivalent to the depth it is desired to have interlock tab 144 enter interlock slot 146 of the lower adjacent lamina layer. Generally, this distance 170 will be equivalent to distance 172 which interlock tab 144 extends below the lower surface of strip stock material 154 when tab 144 is formed.

Each of the laminae and lamina segments of stack 116 has at least one interlock feature formed therein. The bottom lamina of each stack, however, has its interlock tabs completely blanked, i.e., removed, to prevent bottom lamina 118 from being engaged with the uppermost lamina of the previously formed stack when the bottom lamina 118 is separated from the strip stock material and pushed into the choke barrel. Interlocking tabs 144 and slots 146 of adjacent lamina layers maintains the lamina layers in proper relative alignment both when the stack is within choke barrel 148 and after the stack has been removed from choke barrel 148.

Stock lifters 174 are used to prevent interlock tabs 144 from being biased upwardly into the horizontal plane of strip stock material 154 or from being snagged on lower die bed 166 during the progressive movement of strip stock material 154. Stock lifters 174 are biased upwards by springs 176 and lift strip stock material 154 above the upper surface of lower die bed 166 when strip stock material 154 is being advanced between die stamping strokes. Strip stock material 154 is lifted by stock lifters 174 a distance designated 175 in FIG. 14. Lifter distance 175 is often times equivalent to approximately 1.5 times thickness 173 of strip stock material 154 to provide an ample clearance. The illustrated stock lifters 174 are cylindrical. However, other types of stock lifters, such as bar type lifters, are known in the art and can also be used with the present invention.

Figure 15:
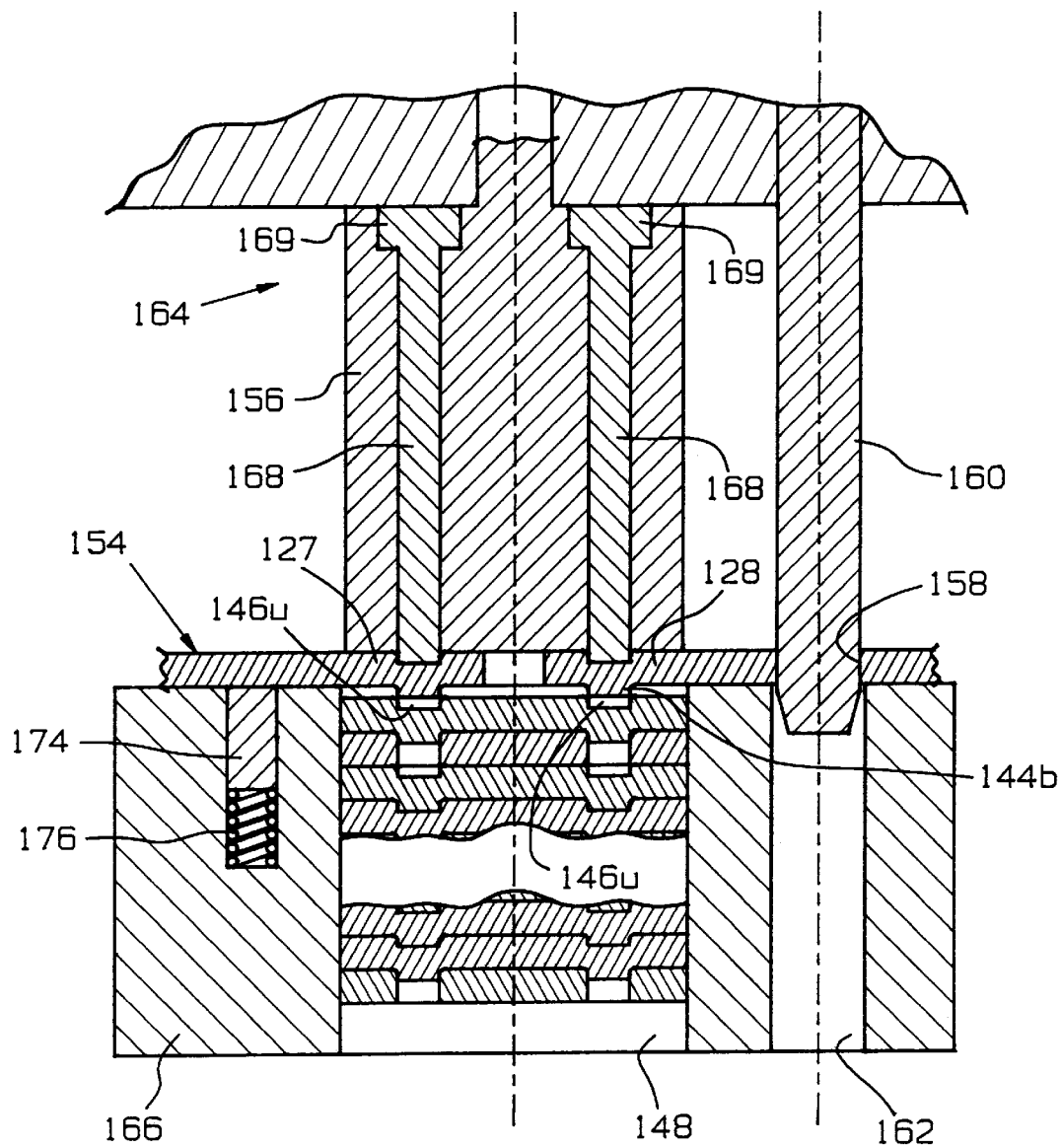
FIG. 15 is a schematic cross sectional view of the die assembly of FIG. 14 after the guide pin has entered the guide bore.

FIG. 14 illustrates the relative positions of upper die assembly 164, punches 156, 168, lower die bed 166 and strip stock material 154 at the initiation of a stamping stroke at the blanking station of the die assembly. FIG. 15 illustrates the die assembly during the downstroke after pilot pin 160 has extended through pilot pin hole 158 and has entered guide bore 162 to thereby properly locate strip stock material 154 and lamina segments 122, 124 which are attached thereto. Shortly after pilot pin 160 has properly aligned strip stock material 154, and the laminae and lamina segments attached thereto by material bridges, staking punches 168 enter interlock slots 146 of the lamina layer which is about to be blanked. Shortly after staking punches 168 enter interlock slots 146, blanking punch 156 engages the upper surface of the lamina layer.

Stock lifter spring 176 has been compressed and strip stock material 154 is pressed against the upper surface of lower die bed 166 in FIG. 15. Strip stock material 154 may be pressed against lower die bed 166 by engagement with the downwardly moving punches or by another suitable mechanism, such as a spring stripper, attached to upper die assembly 164 which presses the strip stock material against lower die bed 166 prior to the engagement of the punches and strip stock material 154.

Figure 16:
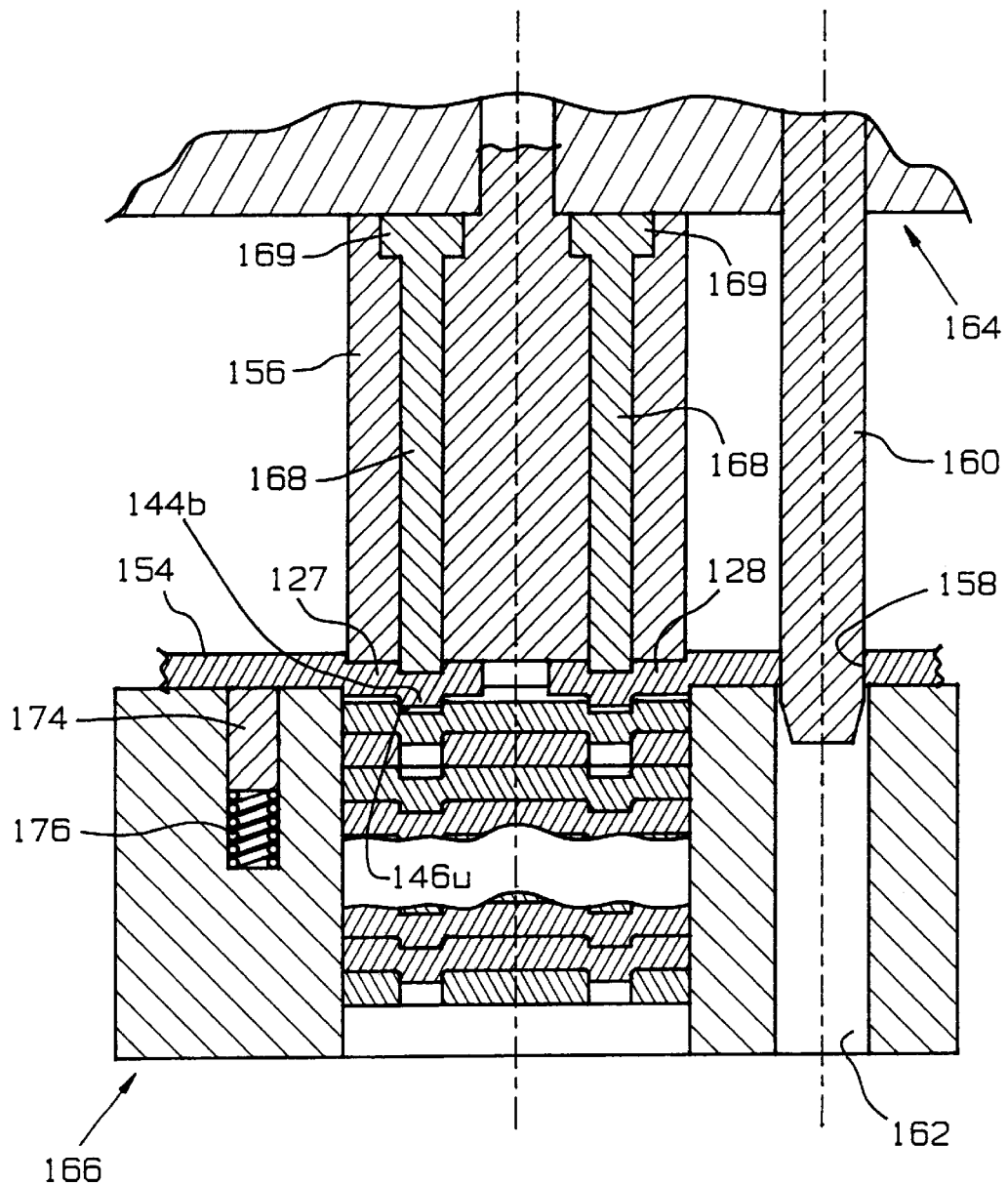
FIG. 16 is a schematic cross sectional view of the die assembly of FIG. 14 wherein the interlock tabs of the discrete lamina segments are being engaged with the uppermost lamina disposed in the choke barrel.

FIG. 16 illustrates the blanking station after the blanking punch has begun to sever lamina segments 122 and 124 from the remainder of strip stock material 154. As shown schematically in FIG. 16, interlock tabs 144b of lamina segments 122, 124 are already partially engaged with interlock slots 146u of the uppermost lamina layer in choke barrel 148. The partial engagement of interlock tabs 144b and interlock slots 146u occurs prior to the complete separation of lamina segments 122, 124 from the remainder of the strip stock material.

Engaging interlock tabs 144b of the discrete lamina segments 122, 124 prior to completely severing lamina segments 122, 124 from the remainder of the strip stock material 154 permits the aligned stacking of lamina 120 even though the segments, once blanked, become separated from each other. The proper and positive alignment of discrete lamina segments 122, 124 is continuously maintained during the stamping process. Initially, guide pin 160 maintains the proper alignment of lamina segments 122, 124 by aligning strip stock material 154. Prior to completely severing lamina segments 122, 124 from strip stock material 154, interlock tabs 144b of the discrete lamina segments being blanked are engaged with interlock slots 146u of the uppermost lamina layer in choke barrel 148 to maintain the alignment of the discrete lamina segments.

To accomplish the engagement of interlock tabs 144b and interlock slots 146u of adjacent laminae prior to the complete severing of the blanked lamina layer from strip stock material 154 the uppermost lamina must be positioned in choke barrel 148 near the upper surface of lower die bed 166. The uppermost lamina is positioned distance 178 below the entrance of the choke barrel located in the upper surface of the lower die bed.

Figure 17:
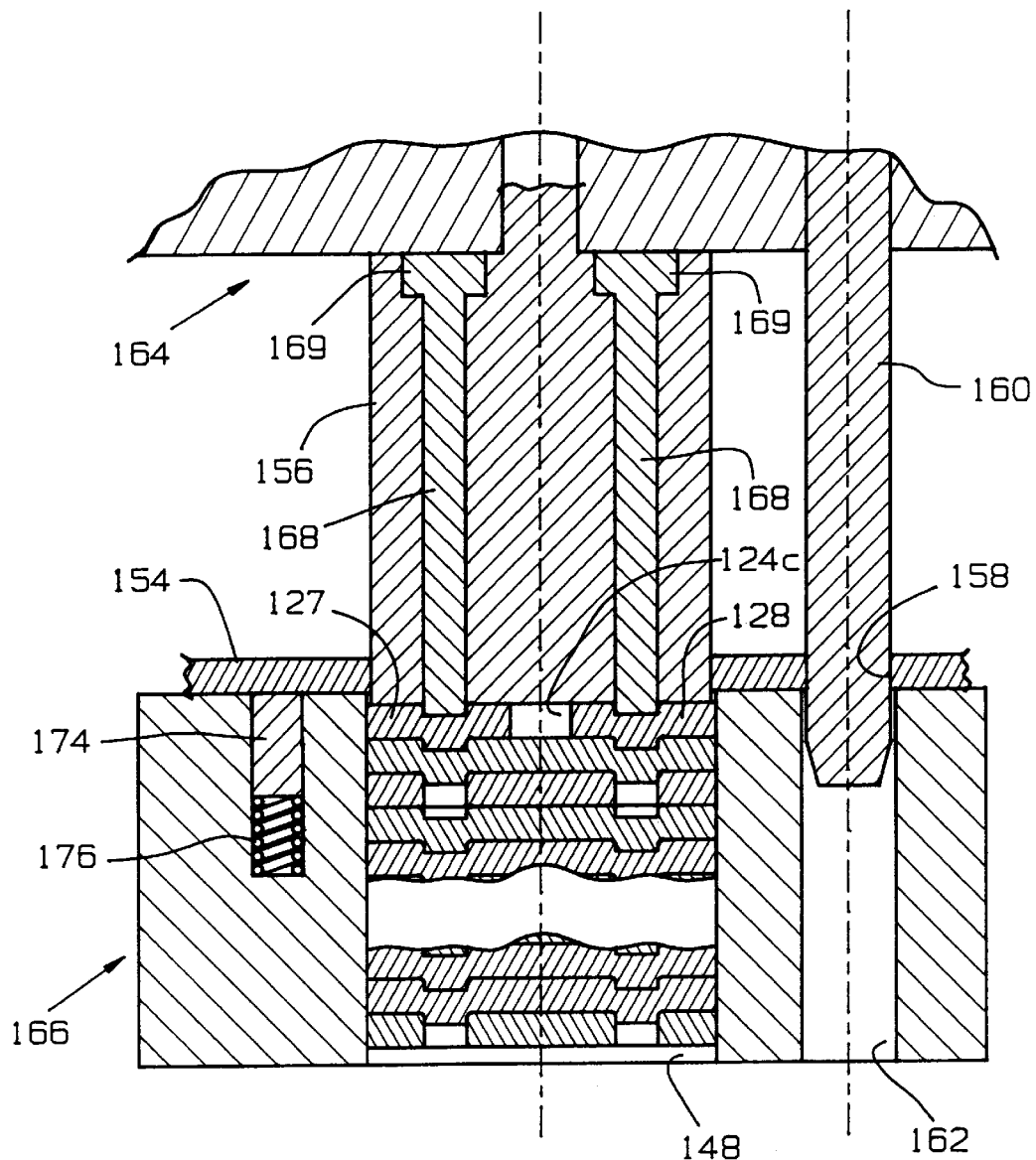
FIG. 17 is a schematic cross sectional view of the blanking punch of FIG. 14 separating the discrete lamina segments from the strip stock material.

Distance 178 (FIG. 14) is determined by the distance blanking punch 156 enters choke barrel 148 at the end of the die assembly downstroke, as shown in FIG. 17. Punch entry distance 178 is typically greater than the thickness 173 of the strip stock material in conventional die assemblies. For example, for a strip stock thickness 173 equivalent to 0.025 inch, a conventional die assembly would often have a punch entry between 0.030 and 0.035 inch.

The present invention, however, utilizes a much smaller punch entry distance 178 (which may be as small as zero) which ensures that interlock tabs 144 of the blanked lamina layer are engaged with the uppermost lamina layer in the choke barrel prior to completely severing the lamina layer being blanked. For example, with reference to FIG. 14, by utilizing a distance 178 which is smaller than distance 172, tabs 144b will be partially interlocked with slots 146u when the die assembly reaches the position shown in FIG. 15. Alternatively, distance 178 can be equivalent to distance 170 as shown in FIGS. 14–17 and interlock tabs 144b will be engaged with slots 146u as the lamina layer being blanked is being severed from strip stock material 154 but prior to complete separation as shown in FIG. 16. It may also be possible to have a distance 178 slightly larger than distance 170 and still provide for the partial interlocking of tabs 144b and slots 146u prior to complete separation of the lamina layer. The partial interlocking in such an arrangement, however, would be minimal.

When a plurality of discrete lamina segments are used to form a single lamina layer, the pressure exerted against each common choke surface 150 by the alignment surfaces of choke barrel 148 will not necessarily be counterbalanced by a force created by an opposing alignment surface. Interlock tabs 144, however, are disposed near common choke surfaces 150 and provide resistance to the pressure exerted by the alignment surfaces and thereby maintain discrete lamina segments in an aligned position. Placing interlock tabs 144 near common choke surfaces 150 also minimizes any bowing or distortion of the lamina by limiting the area of the lamina which is stressed by the pressure applied by the alignment surfaces.

Blanking punch 156 severs the material bridges which connect lamina segments 122, 124 to the remainder of strip stock material 154 in cooperation with cutting edges on the upper lip of choke barrel 148. Typically, after blanking punch 156 has sheared the lamina layer to a depth which is approximately ⅓ of the lamina thickness, the lower ⅔ of the strip stock material will fracture and the lamina layer will be completely separated from the strip stock material. The use of a softer, more elastic strip stock material, however, would permit the blanking punch to enter the strip stock material for more than ⅓ of the lamina thickness and produce a lamina with a smaller fracture zone. As discussed above, the proper alignment of discrete lamina segments 122, 124 is maintained by engagement of interlock tabs 144b prior to the fracturing of the strip stock material attaching discrete lamina segments 122, 124 to the remainder of strip stock material 154.

The downstroke is finished by pushing discrete lamina segments 122, 124 into further engagement with the uppermost lamina in choke barrel 148 and pushing lamina segments 122, 124 to depth 178 below the upper surface of lower die bed 166 as schematically illustrated in FIG. 17. After blanking punch 156 is retracted, stock lifters 74 elevate strip stock material 154, strip stock material 154 is advanced within the die assembly, and the stamping cycle is repeated. A die assembly embodying the present invention may be operated at speeds which are typical for interlocked laminae, e.g., 300 or more strokes per minute. The maximum speed of operation of any particular die assembly is dependent upon a number of different variables relating to the complexity of the die assembly and the material handling requirements imposed upon the die assembly by the dimensions and configuration of the lamina stack being manufactured. For most lamina stack and die assembly designs, however, the stamping and stacking of two discrete lamina segments to form a single layer in a lamina stack should not, by itself, have a direct impact upon the speed at which individual die assemblies are operated.

The ability to automatically stamp and stack a plurality of laminae which include a lamina layer formed by a plurality of discrete lamina segments permits the economical manufacture of parts which might otherwise be more expensively manufactured from a single layer of material. For example, the ability to stack lamina layers having a plurality of discrete lamina segments permits the manufacture, in a single operation, of laminated parts wherein a plurality of apertures or other discontinuities are located in the part so as to prevent the use of an integral lamina for one or more layers of the stack. Conventional manufacture of such parts often involves the stamping of a single, relatively thick, material layer and forming the apertures or other discontinuities with secondary operations such as drilling or milling. Additionally, as described in greater detail below, a higher quality stamped edge can be realized by utilizing a plurality of laminae instead of stamping a single thick material layer.

FIGS. 18 and 19 schematically, and in exaggerated fashion for the sake of clarity, illustrate edges which have been sheared by a stamping process. With reference to thick material 180, the process of stamping a part from a sheet of stock material with blanking punch 156 will be described in greater detail. When punch 156 first engages the material, the material will deform plastically before it is sheared. The initial plastic deformation results in rounded corner 182. The material will then be sheared by the penetration of the punch until the lower portion of the strip stock material fractures. Typically, the punch will penetrate approximately ⅓ of the lamina thickness before the lower ⅔ of the lamina fractures. This leaves a relatively smooth shear cut band 184, marked by cross hatching, and a rougher fracture zone 186. Thin laminae 190 shown in FIG. 19 have rounded corners 192, shear cut bands 194 and fracture zones 196 on their cut edges which are proportionally similar to those of thick material 180, e.g., shear band 194 is approximately ⅓ the thickness of the lamina material. Although proportional, the magnitude of the individual edge depressions which are located in the fracture zone 196 of thinner laminae 190 are smaller than the depressions located in fracture zone 186 of thick material 180. Rounded edge depression 182 shown in FIG. 19 is also smaller than depression 192 shown in FIG. 18. Thus, by utilizing a plurality of thinner laminae 190 instead of thick material 180, one can manufacture a part having an edge wherein the magnitude of the roughness is reduced and the clean shear cut band is more evenly distributed. For example, a clutch plate having the form of a splined disk could be formed by stamping and stacking ten 0.025 inch laminae to thereby provide a higher quality edge surface than a single 0.25 inch layer of stamped material.

Figure 20:
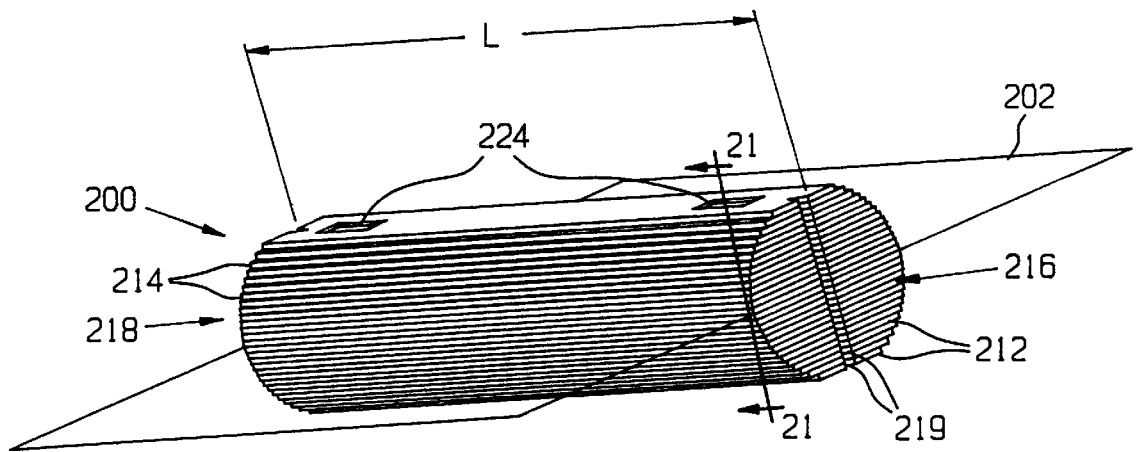
FIG. 20 is a perspective view of a long, slender lamina stack produced in accordance with an embodiment of the present invention.

In accordance with yet another embodiment of the present invention, FIG. 20 illustrates long, slender lamina stack 200 having laminae of differing widths which are stacked so as to form a generally cylindrical part, with each lamina having a common length. Although stack 200 is generally cylindrical, it is to be understood that this is but one possible embodiment of a stack produced according to the present invention; other embodiments having other shapes are to be considered within the scope of the present invention. In the shown embodiment of the present invention, the individual laminae comprising stack 200 are stamped from the strip stock material such that the length of each lamina lies along the grain of the material, i.e., along the longitudinal directions of the strip stock material. This stamping orientation provides each lamina and thus stack 200 with electrical conductivity properties which differ from what would result if the laminae were stamped from the strip stock material such that the length of each lamina lies across the grain of the material, i.e., along the strip stock material width, which may be an important consideration depending on the application for which stack 200 is used. Further, each lamina in stack 200 may be made of steel and may or may not be coated with a dielectric material. Those skilled in the art will appreciate that the process and apparatus of the present invention may be readily applied to produce stacks having "cross grain" lamina lengths. Such a "cross grain" embodiment of the present invention would provide the advantage of allowing a shorter die assembly, which requires less space. Moreover, those skilled in the art will recognize that multiple die assemblies as described hereinbelow may be arranged in parallel and "ganged" such that each die assembly apparatus and process is commonly controlled by a single controller 108 (FIG. 11). It is also envisioned that corresponding punches in each die assembly may utilize a single pneumatic cylinder for their simultaneous actuation.

Figure 21:
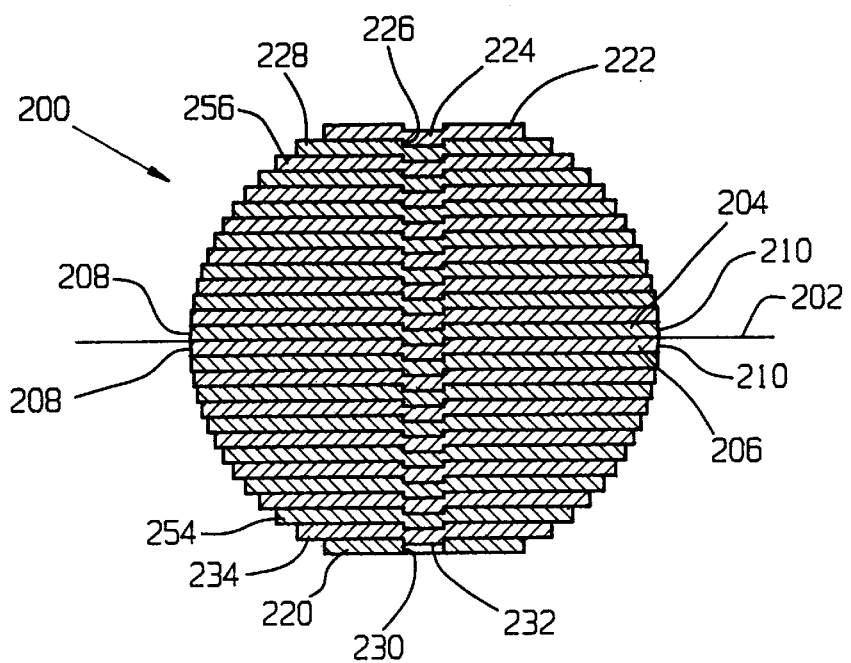
FIG. 21 is a cross sectional end view of the stack shown in FIG. 20, along line 21—21 thereof.

A cross sectional view of cylindrical stack 200 through its interlocking tabs and slots is shown in FIG. 21. As shown in FIGS. 20, 21, stack 200 comprises an equal number of laminae disposed on opposite sides of central plane 202, with midmost laminae 204, 206, which are identical, being the widest in the stack, their first and second side edges 208, 210, respectively, in frictional contact with the adjacent choke surfaces during the stack assembly operation, as further described hereinbelow. Each of the laminae in stack 200 is of a common length L (FIG. 20) and each has a first and second end edges 212, 214, respectively which define opposite end surfaces 216, 218. The first and second end edges 212, 214 of each lamina in stack 200 are in frictional contact with the adjacent choke surfaces during the stack assembly operation. Further, the first and second end edges 212, 214 of each lamina in stack 200 are provided with notch 219 which, when the individual laminae are stacked, form a straight groove or slot along end surfaces 216, 218 of stack 200. As illustrated, notch 219 has a triangular shape, but may be of another shape (e.g., rectangular or semicircular) suitable to help maintain the correct position of the laminae or the stack within the choke passageway as described further below.

As seen in FIG. 21, bottommost lamina 220 and topmost lamina 222 of stack 200 are of a common width, with topmost lamina 222 provided with an interlock tab 224 which engages slot 226 of adjacent lamina 228 which it overlies, and bottommost lamina 220 provided only with a slot 230 which receives tab 232 of overlying lamina 234, which is identical to lamina 228. Although stack 200 is cylindrical, those skilled in the art will appreciate that the method and apparatus for its manufacture herein described may be adapted to produce long, slender lamina stacks having other shapes and having cross sectional sides which do not lie substantially in planes parallel with the direction of travel of the stack through the choke opening or passageway. Further, although cylindrical stack 200 comprises two widest laminae (204, 206) having side edges which frictionally engage the adjacent choke surfaces, it is envisioned that a long, slender stack produced according to the present invention may comprise only a single lamina of greatest width, the side edges of which engage the adjacent choke surfaces, and that the widest lamina(s) need not be vertically middlemost in the stack, as laminae 204, 206 are. Indeed, the widest lamina(s) may be anywhere in the stack and, if a plurality of widest laminae are included, they need not be adjacent to one another.

Figure 22:
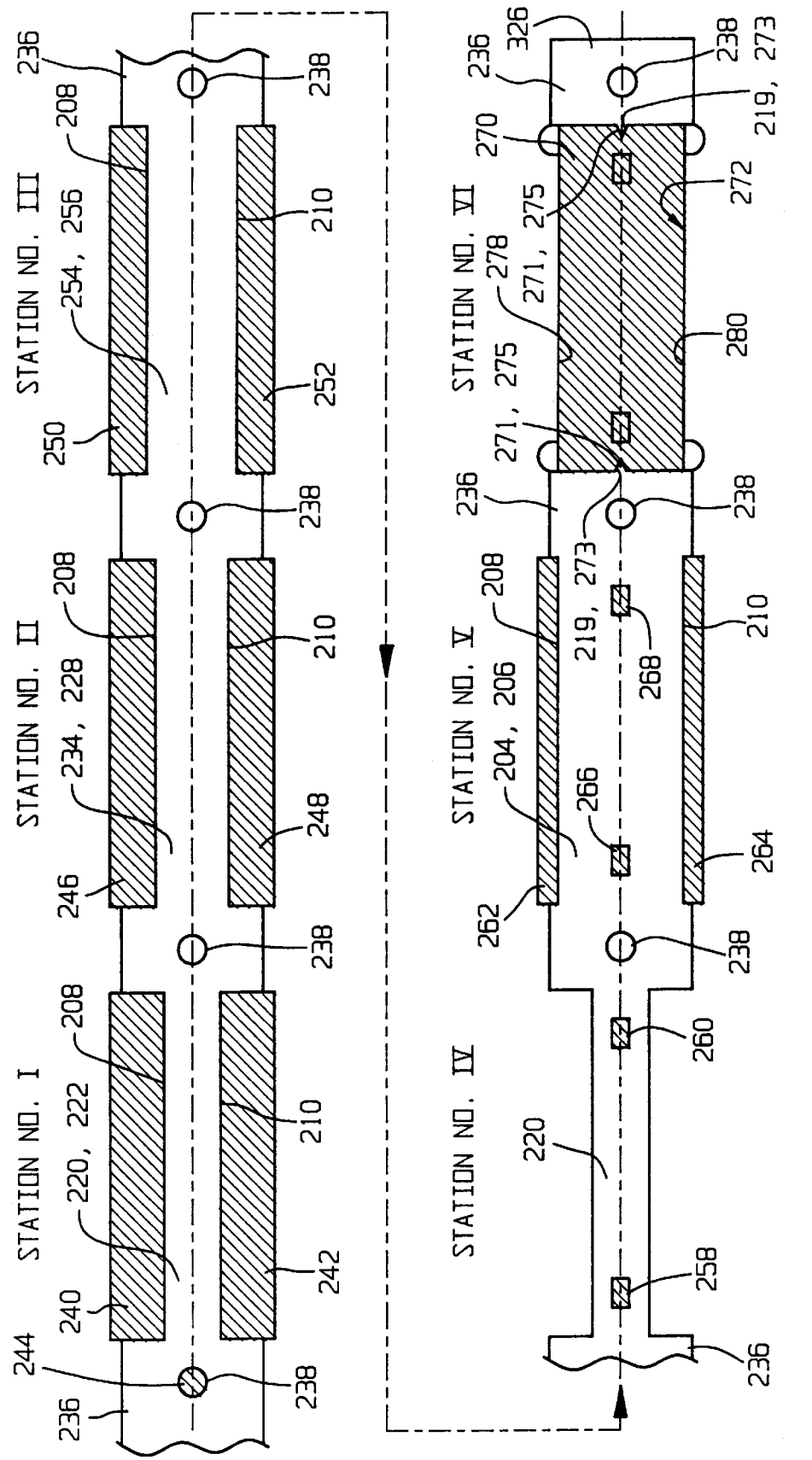
FIG. 22 is a plan view of an embodiment of a strip layout for producing the stack shown in FIG. 20.

A strip layout showing a stamping progression in accordance with the present invention is shown in FIG. 22. The laminae produced by the strip layout of FIG. 22 are used to produce a cylindrical stack 200, although only some of stations which produce the many laminae of various widths are represented.

At Station No. I, material is punched (removed) from strip stock 236 which defines first and second side edges 208, 210 of bottommost lamina 220 and topmost lamina 222, which are of common width (see FIG. 21). Pilot pin hole 238, used to guide and align the strip stock 236 at subsequent stations, is also punched at Station No. I. Punches 240, 242 which form first and second side edges 208, 210 of lamina 220 and 222 at Station No. I are selectively actuated in the above-described manner, while punch 244 which forms pilot pin hole 238 is actuated during each punch cycle. Punches 240 and 242 may, of course, comprise portions of a single, selectively actuated punch, as may each pair of punches at each of the subsequent stations.

Station No. II includes selectively actuated punches 246, 248 which remove material from strip stock 236 to define first and second side edges 208, 210 of lamina 234 and lamina 228, which are of common width and which are respectively adjacent bottommost lamina 220 and topmost lamina 222 in stack 200 (see FIG. 21).

At Station No. III, selectively actuated punches 250, 252 remove material from strip stock 236 to define first and second side edges 208, 210 of lamina 254 and lamina 256, which are of common width and which are respectively adjacent laminae 234 and 228 in stack 200 (see FIG. 21).

Between Stations Nos. III and IV are located a plurality of other stations having selectively actuated punches which define first and second side edges 208, 210 of the other laminae located above widest lamina 204 and below widest lamina 206 in stack 200.

Station No. IV is a selectively actuated punch station which is actuated for only the bottom lamina (220) of each stack. The material removed from the strip stock by punches 258, 260 at Station No. IV would otherwise be formed into an interlock tab and slot at Station No. V.

At Station No. V, punches 262, 264 remove material from strip stock 236 to define first and second side edges 208, 210 of middlemost laminae 204, 206, which are of common width. Punches 266, 268 provide the interlocking tabs and slots in each lamina of stack 200 except for bottommost lamina 220 (see FIG. 21). The punches at Station No. V do not have to be selectively actuated because if the punches are always operative they would simply not remove any additional material from the sides of any of the laminae which lie above widest lamina 204 or below widest lamina 206, or create any additional interlock features in bottommost lamina 220. By limiting the use of selectively actuated dies to only those situations where they are indispensable the cost of the die assembly is minimized.

At Station No. VI, all of the laminae are blanked from the remaining strip stock 236. Blanking punch 270, which is not selectively actuated, severs the laminae therefrom, forms their first and second longitudinal end edges 212, 214, and presses them into choke passageway or opening 272. Blanking punch 270 is provided with notch 273 on opposed sides thereof which cooperate with mating protrusions 271 (FIGS. 22, 23) in opposed sides of the blanking die for forming notch 219 in each lamina as it is blanked from strip stock material 236. Due to the relatively short height of lamina stack 200, the compounding of the thickness inconsistencies of the individual laminae is not likely to create significant parallelism concerns in stack 200. Thus, illustrated choke passageway or opening 272 is non-rotatable. If the stack is to be substantially tall, however, and the symmetry of the individual laminae about their longitudinal axes allows the choke passageway to accommodate it, the choke passageway and the elongate stack(s) therein may be rotated 180°.

As in the above-described embodiments, choke passageway 272 (shown schematically in FIG. 11) into which the laminae are pressed has alignment surfaces which correspond with and frictionally engage first and second end surfaces 216, 218 and first and second side edges 208, 210 of widest laminae 204, 206. The alignment surfaces of choke passageway define an outer perimeter which is equal to or slightly less, e.g., by 0.001 inch, than the outer perimeter defined by first and second edges 208, 210 of widest laminae 204, 206 and first and second end edges 212, 214 of each lamina to thereby provide an interference fit engagement with the laminae. This interference fit engagement of each of the laminae maintains the laminae in an aligned position and also resists the movement of the laminae through the choke passageway. This allows subsequent laminae to be pressed into interlocked engagement with the laminae already in the choke passageway. To further ensure proper orientation of laminae or completed stacks in choke passageway 272, protrusions 271 in the blanking die, with which punch notches 273 cooperate, continually extend into passageway 272 along the opposed end surfaces thereof, forming ridges 275 (FIGS. 22, 23) thereon. At each respective end edge 212, 214 of a lamina, notch 219 is slidably received on ridge 275, thus ensuring that those individual laminae which have insufficient width to engage choke passageway side surfaces 278, 280 remain properly positioned laterally. The sliding engagement of notches 219 over ridges 275 is particularly useful in maintaining the alignment of the laminae below the lowermost widest lamina. For example, in producing cylindrical stack 200, the engagement of notches 219 on ridges 275 ensures that a partial stack consisting only of bottommost lamina 220 up to and including lamina 281 (the lamina which is adjacently below lower middle and widest lamina 206; see FIGS. 24, 25) remains correctly positioned in choke passageway 272. Otherwise, such a partial stack would depend solely on the frictional engagement of its laminae's end edges 212, 214 with adjacent choke end surfaces 282, 284, respectively, for maintaining its proper orientation in the choke passageway. Further, the engagement of the grooves in stack end surfaces 216, 218, which are formed by aligned notches 19, over ridges 275 provided on adjacent choke end surfaces 282, 284, respectively, preclude the possibility of stack 200 inadvertently rotating about its longitudinal axis within passageway 272. Notches 219 may frictionally engage ridges 275 or, alternatively, the cross sections of ridges 275 may be slightly undersized vis-a-vis blanking die protrusions 271, thus providing a slight clearance between notches 219 and ridges 275. Those skilled in the art will recognize that, conversely, a notch may instead be provided in opposite sides of blanking die 294, extending as grooves in choke end surfaces 282, 284. Protrusions may then be provided in opposite sides of blanking punch 270 which would form protrusions in each lamina, the lamina protrusions slidably received in the grooves formed in choke passageway 272, in the manner described above, for maintaining proper orientation of the laminae or stacks in the choke passageway.

Figure 23:
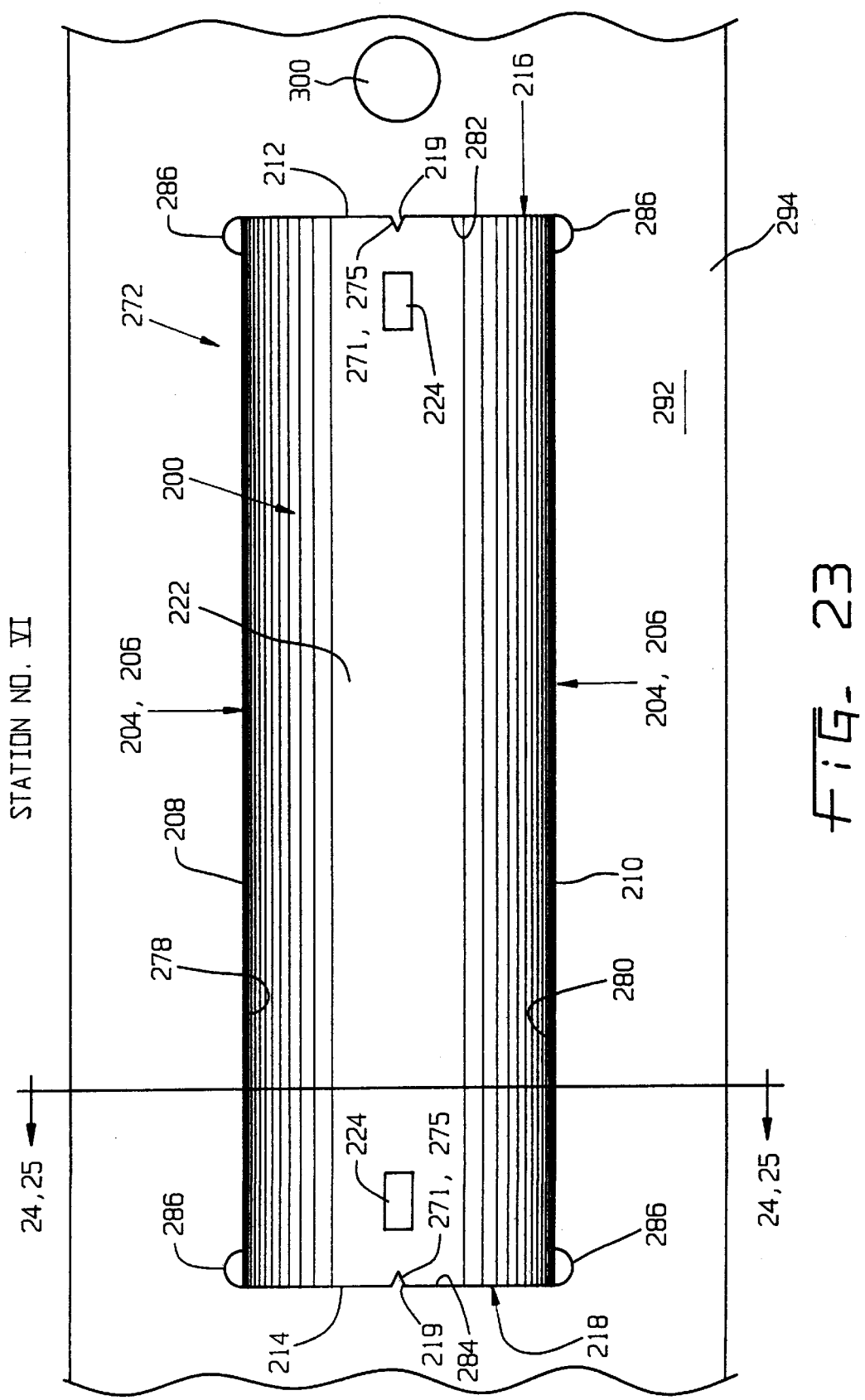
FIG. 23 is a fragmentary plan view of the blanking station of FIG. 22, showing the stack of FIG. 20 in the choke passageway thereof.

Notably, it may not be necessary for choke passageway side surfaces 278, 280 to continuously contact first and second edges 208, 210 of widest laminae 204, 206, as shown in FIGS. 22 and 23. Indeed, choke passageway 272 may be provided with downwardly-extending grooves or carbide bar inserts (not shown) which define intermittent side surfaces 278, 280 which contact first and second side edges 208, 210 of widest laminae 204, 206 only at longitudinally spaced contact areas. Such spaced contact of the choke side walls 278, 280 with edges 208, 210 of the widest laminae may be designed to provide stack 200 with the proper resistance to movement along choke passageway 272 and to prevent possible buckling, bending or rotation of the stack or individual laminae while in the choke passageway. Further, as seen in FIG. 23, the junctures of side surfaces 278, 280 and end surfaces 282, 284 of choke passageway 272 may be provided with reliefs 286 which extend into side surfaces 278, 280 to ensure that the longitudinal ends of widest laminae 204, 206 contact the choke passageway only at their first and second end edges 212, 214, allowing better control of the stack's resistance to movement through the choke. Thus, when the stack has been completed, the individual common first and second end edges 212, 214 of each lamina form first and second stack end choke surfaces 216, 218.

Choke passageway 272 ordinarily contains a plurality of stacks 200, and, as will be discussed further hereinbelow, for each stack 200 in the choke passageway, the frictional engagement of its surfaces 216, 218 and the portions of first and second side edges 208, 210 of its widest laminae 204, 206 which are in contact with choke side walls 278, 280 contribute a portion of the overall frictional resistance which holds the topmost lamina in the choke passageway in place for interlocking with an overlying lamina of the same stack. Resistance to downward movement in the choke barrel provides the back pressure necessary to engage the interlock tabs of the laminae when the overlying lamina is pressed into engagement with the remainder of a partially formed stack in choke passageway 272.

Figure 24:
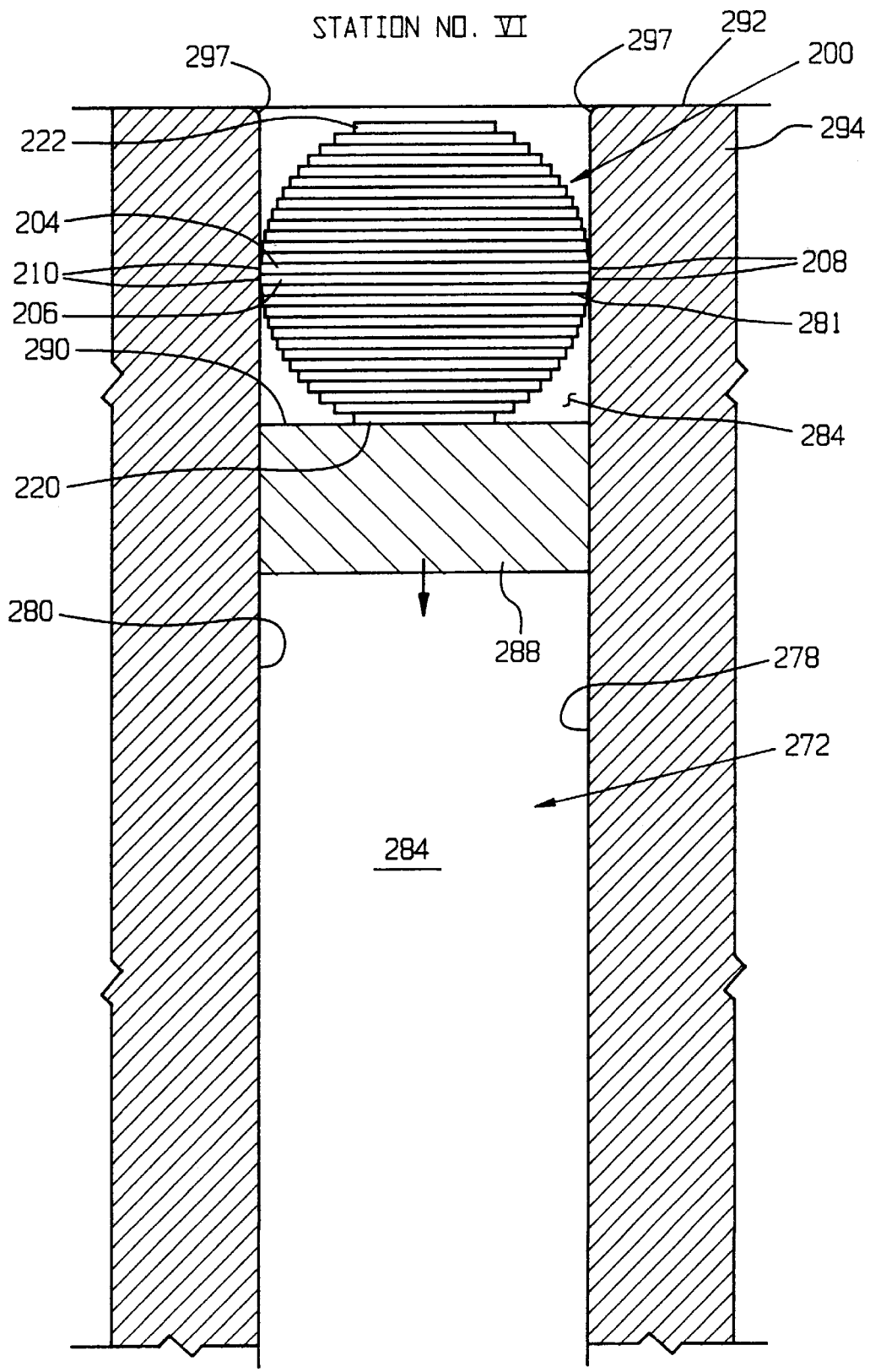
FIG. 24 is a fragmentary sectional end view of the die assembly station shown in FIG. 23, along line 24—24 thereof, a completed initial stack shown in the choke passageway.

Referring to FIG. 24, during the manufacture of the initial stacks 200, the back pressure otherwise provided by a plurality of completed stacks within choke passageway 272 may be provided by plug 288, which may be made of plastic, wood or other suitable material. Plug 288 is of sufficient circumferential size and thickness that once forced into choke passageway 272, sufficient resistance to movement of the individual laminae and stacks 200 is provided for the tabs and slots to interlock. Plug 288 is placed in the choke passageway such that its upper surface 290 is initially flush with upper surface 292 of lower blanking die bed 294. Alternatively, a hydraulic or pneumatic backpressure device (not shown), such as known in the art, may be used in lieu of plug 288 to provide resistance to movement of the laminae of the initial stacks until a sufficient plurality of stacks has been accumulated in passageway 272. Once choke passageway 272 is completely filled with a plurality of stacks 200, which provide sufficient frictional engagement with the engaging surfaces of the choke to create sufficient back pressure for interlocking the tabs and slots of the individual stacks 200, plug 288 will drop out of the choke passageway, no longer needed until the next time the process begins again with a clear choke passageway. The size of plug 288, the number of stacks 200 which are to be contained within passageway 272, the resistance to movement through passageway 272 each stack 200 provides, and the resistance necessary to interlock the tabs and slots of the laminae are characteristics which may be varied to suit the particular apparatus and/or the stacks it produces.

As in the previously-discussed embodiment, to minimize the risk of undesirable bowing, the alignment surfaces of choke passageway 272 utilize a relatively light interference fit which exerts a reduced pressure on each individual lamina but which develops that pressure over a relatively greater vertical depth to thereby provide an adequate total back pressure for engagement of the interlock tabs. For example, in an application wherein a conventional interference fit might involve a 0.001 inch interference fit and a choke depth of 1.25 inches, the present application might utilize a 0.0002 to 0.0005 inch interference fit and a choke depth of 3 inches. Resistance to downward movement within the choke is needed to facilitate the engagement of the interlock tabs of the lamina being blanked with the interlock slots of the uppermost lamina in the choke passageway. The pressure exerted on the individual laminae not only provides resistance to downward motion through the choke passageway, but also helps maintain the laminae in proper alignment.

Figure 25:
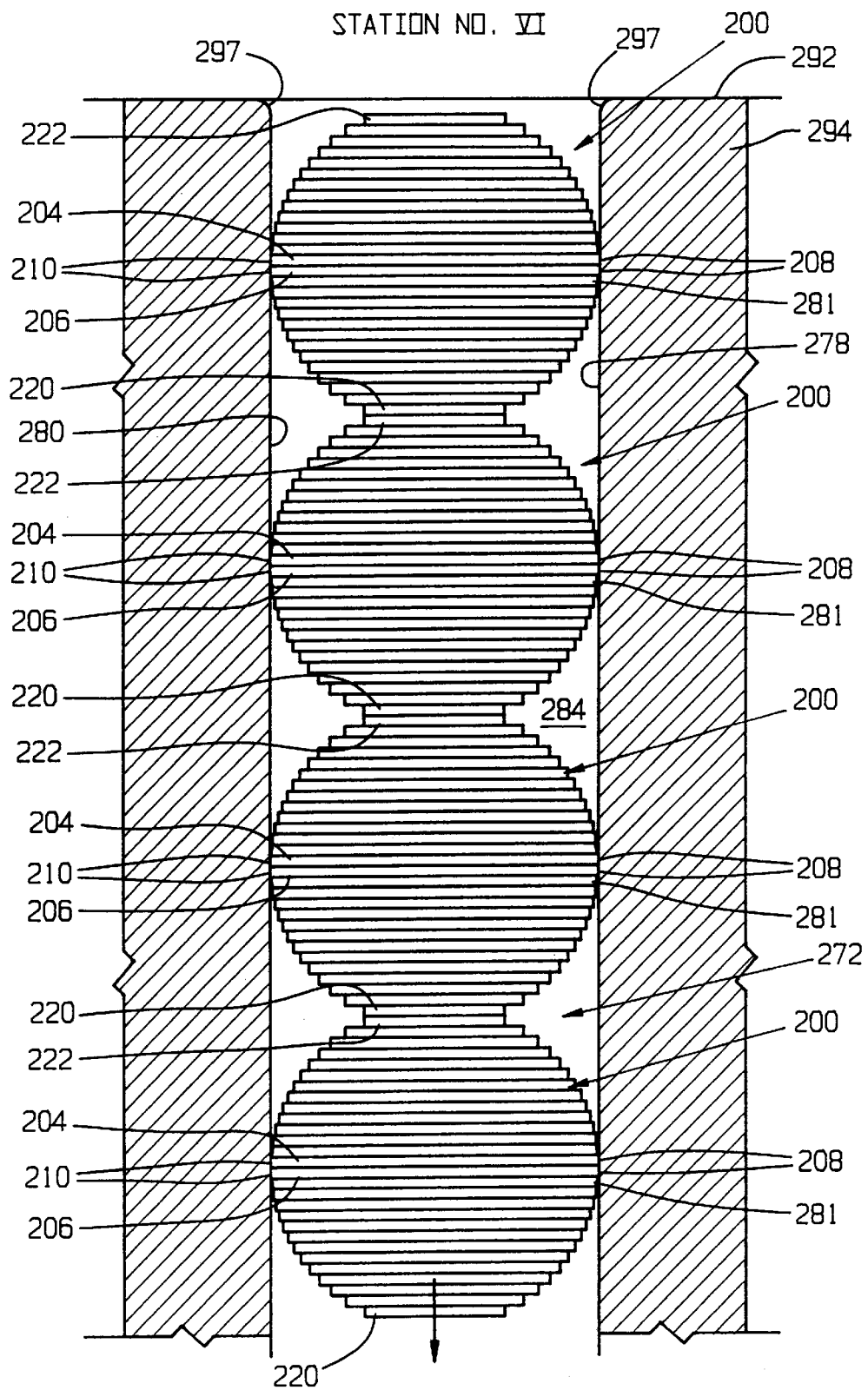
FIG. 25 is a fragmentary sectional end view of the die assembly station shown in FIG. 23, along line 25—25 thereof, a plurality of completed stacks shown in the choke passageway.

The stacking of one of a plurality of laminae which form a stack 200 is schematically illustrated in FIGS. 26–29, which generally correspond to FIGS. 14–17 discussed above. FIGS. 26–29 sequentially illustrate blanking Station No. VI of FIG. 22, at which an individual lamina 296 is automatically stacked within choke passageway 272 during a single die stroke. Further, as shown in FIGS. 24 and 25, each of the corners where choke side surfaces 278, 280 join upper surface 292 of lower blanking die bed 294 are provided with lead-in radius 297, which may be approximately 0.005 to 0.010 inches. Lead-in radii 297 help the widest laminae enter and become laterally centered in the choke. Notably, lead-in radii are not used on choke surfaces which interact with a punch for cutting lamina edges.

As described above, the laminae which comprise lamina stack 200 are formed by stamping various features in strip stock material 236 as it progresses through the die assembly prior to reaching the Station No. VI. The laminae are attached to the strip stock material at their longitudinal ends, which are severed by blanking punch 270 to form first and second end edges 212, 214 thereon. Strip stock material 236 includes pilot pin holes 238 which form apertures in the carrier portion of the strip stock material, i.e., that portion of strip stock material which is not used to form laminae. Pilot pin holes 238 are used to maintain the strip stock material in a desired position relative to the die stations as it is stamped during its advancement through the die assembly. As can be seen in FIGS. 26–29, pilot pin 298 passes through pilot pin hole 238 and enters guide bore 300 to properly locate strip stock material 236 and the laminae which are attached thereto relative to the blanking station prior to stamping the strip stock material 236. Although only one pilot pin 298 is illustrated, pilot pins are located adjacent each punching station of the die assembly to maintain strip stock material 236 in proper alignment during stamping operations.

Figure 26:
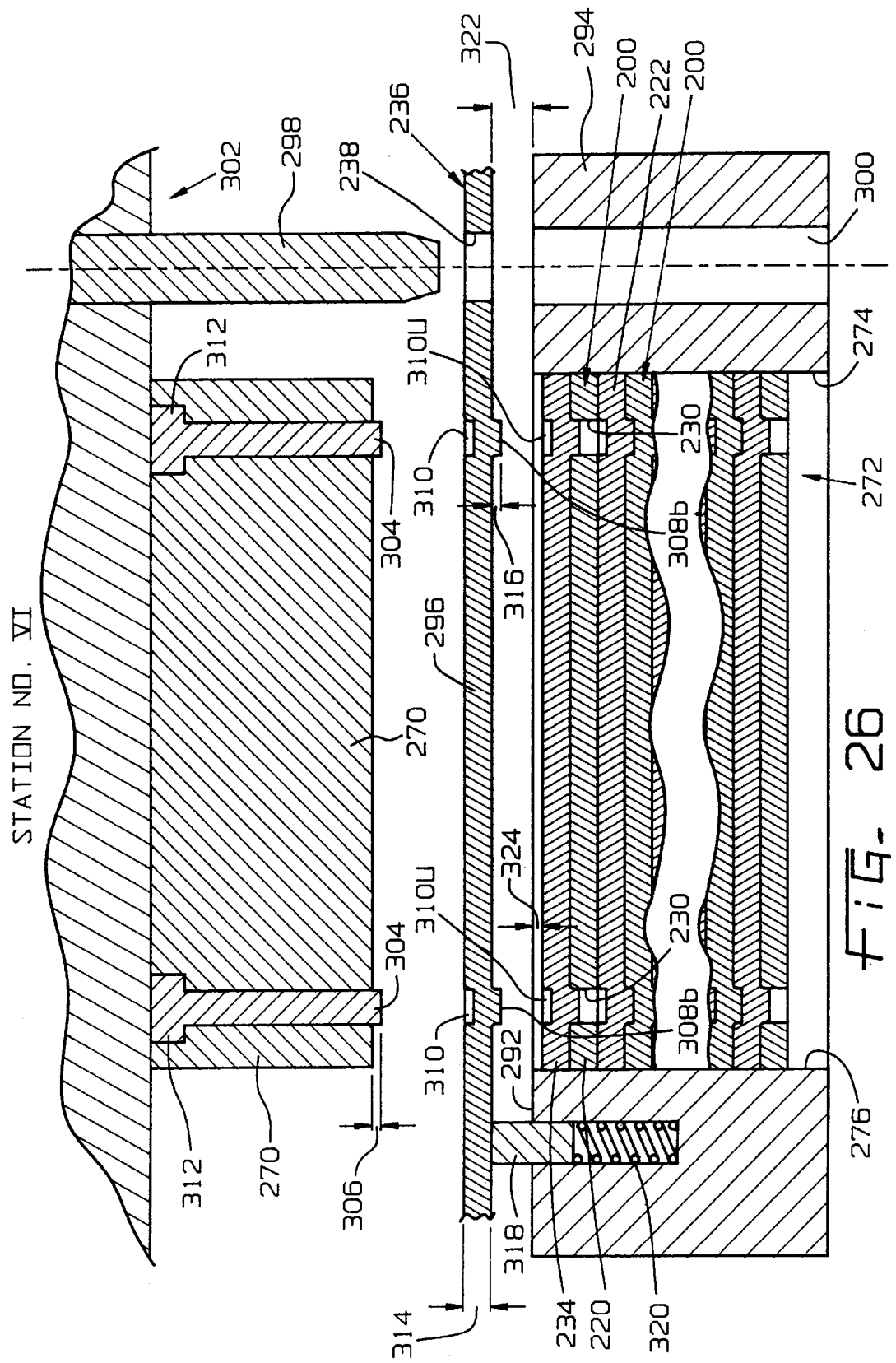
FIG. 26 is a schematic cross sectional view of the die assembly at the blanking station of FIG. 22 at the beginning of a stamping stroke, a completed and a partially completed stack shown in the choke passageway.

FIG. 26 schematically illustrates a portion of upper die assembly 302 and lower die bed 294. Upper die assembly 302 reciprocates vertically, together with pilot pin 298 and blanking punch 270, to stamp the laminae. Blanking punch 270 severs each lamina from the remainder of strip stock material 236 and pushes that laminae into engagement with the uppermost lamina layer disposed in choke passageway 272.

Blanking punch 270 includes staking punch inserts 304 which extend below the bottom surface of the blanking punch by a distance designated 306 in FIG. 26. Staking punches 304 correspond to the location of interlock tabs 308 and enter the lamina slot 310 of the lamina being blanked from strip stock 236 and positively engage the respective lamina tabs 308*b* of the lamina being blanked with the respective interlock slots 310*u* of the uppermost lamina layer disposed in choke passageway 272.

Staking punch inserts 304 are held in a fixed position relative to blanking punch 270 and each include head 312 which is seated in a counterbore in blanking punch 270. A grind collar (not shown) may be located below head 312 to permit the lowering of staking punch 304 relative to blanking punch 270. Lowering of the staking punch might be necessary due to chipping or wear of staking punch 304 or to accommodate different interlock tab depths. As described above, a number of different interlock tab designs are known in the art and the tab design will influence the selection of the appropriate tab depth. In the illustrated embodiment, lamina stack 200 utilizes a design in which no portion of interlock tab 308 is completely severed from the surrounding lamina material. Instead, interlock tab 308 is partially blanked from the surrounding material, deforming, but not severing, the material at the edges of interlock tab 308, and extend below the bottom of the remainder of the lamina by approximately ½ to ⅓ the thickness of the lamina layer. As described above, alternative embodiments of the present invention may employ alternative interlock styles or have the interlock tabs extend a greater or less distance below the remainder of the lamina.

The thickness of the lamina is designated 314 in FIG. 26, and is approximately 0.010 to 0.015 inch, although stacks made according to the present invention may comprise thicker laminae. The distance by which tab 308 extends below the lower lamina surface is designated 316 in FIG. 26 and is equivalent to the distance 306 by which staking punch 304 extends below blanking punch 270. Because these laminae are rather thin, distance 316 may be equivalent to lamina thickness 314 or even greater to ensure proper engagement of tab 308*b* with mating slot 310*u*; the material forming tabs 308 will compress slightly towards the underside of its lamina should distance 316 of tab 308*b* be greater than the depth of tab 310*u*. Should tabs 308 of lamina 234, which overlies bottommost lamina 220 of a stack extend completely through slots blanked 230 in the bottommost lamina, however, distance 316 should not be so great as to permanently engage the tabs of lamina 234 and slots 310 of topmost lamina 222 of the stack below. The length designations shown in FIG. 26 are included merely to provide a convenient mechanism for graphically identifying the lengths and spatial relationships discussed herein and are not necessarily to scale.

As discussed above, staking punches 304 are used to ensure engagement of interlock tabs 308 into interlock slots 310 and to prevent interlock tabs 308 from being forced upwardly into the horizontal plane of the remainder of the lamina when tab 308 engages the uppermost lamina in choke passageway 272. Distance 306 which staking punches 304 extend below the bottom surface of blanking punch 270 is equivalent to the depth it is desired to have interlock tab 308 enter interlock slot 310 of the lower adjacent lamina, and generally will be equivalent to distance 316 which interlock tab 308 extends below the lower surface of strip stock material 236 when tab 308 is formed.

Each of the laminae of stack 200 has at least one interlock feature formed therein. The bottom lamina of each stack, however, has its interlock tabs completely blanked, i.e., removed, to prevent the bottom lamina 220 from being engaged with uppermost lamina 222 of the previously formed stack when bottom lamina 220 is separated from the strip stock material and pushed into the choke passageway. Interlocking tabs 308 and slots 310 of adjacent lamina layers maintains the lamina layers in proper relative alignment both when the stack is within choke passageway 272 and after the stack has been removed from the choke passageway.

Stock lifters 318 are used to prevent interlock tabs 308 from being biased upwardly into the horizontal plane of the strip stock material 236 or from being snagged on lower die bed 294 during the progressive movement of strip stock material 236. Stock lifters 318 are biased upwards by springs 320 and lift strip stock material 236 above upper surface 292 of lower die bed 294 when strip stock material 236 is being advanced between die stamping strokes. The strip stock material 236 is lifted by stock lifters 318 a distance designated 322 in FIG. 26. Lifter distance 322 is usually equivalent to approximately 1.5 times the thickness 314 of strip stock material 236 to provide an ample clearance. The illustrated stock lifters 318 are cylindrical, but other types of stock lifters, such as bar type lifters, are known in the art and can also be used with the present invention.

Figure 27:
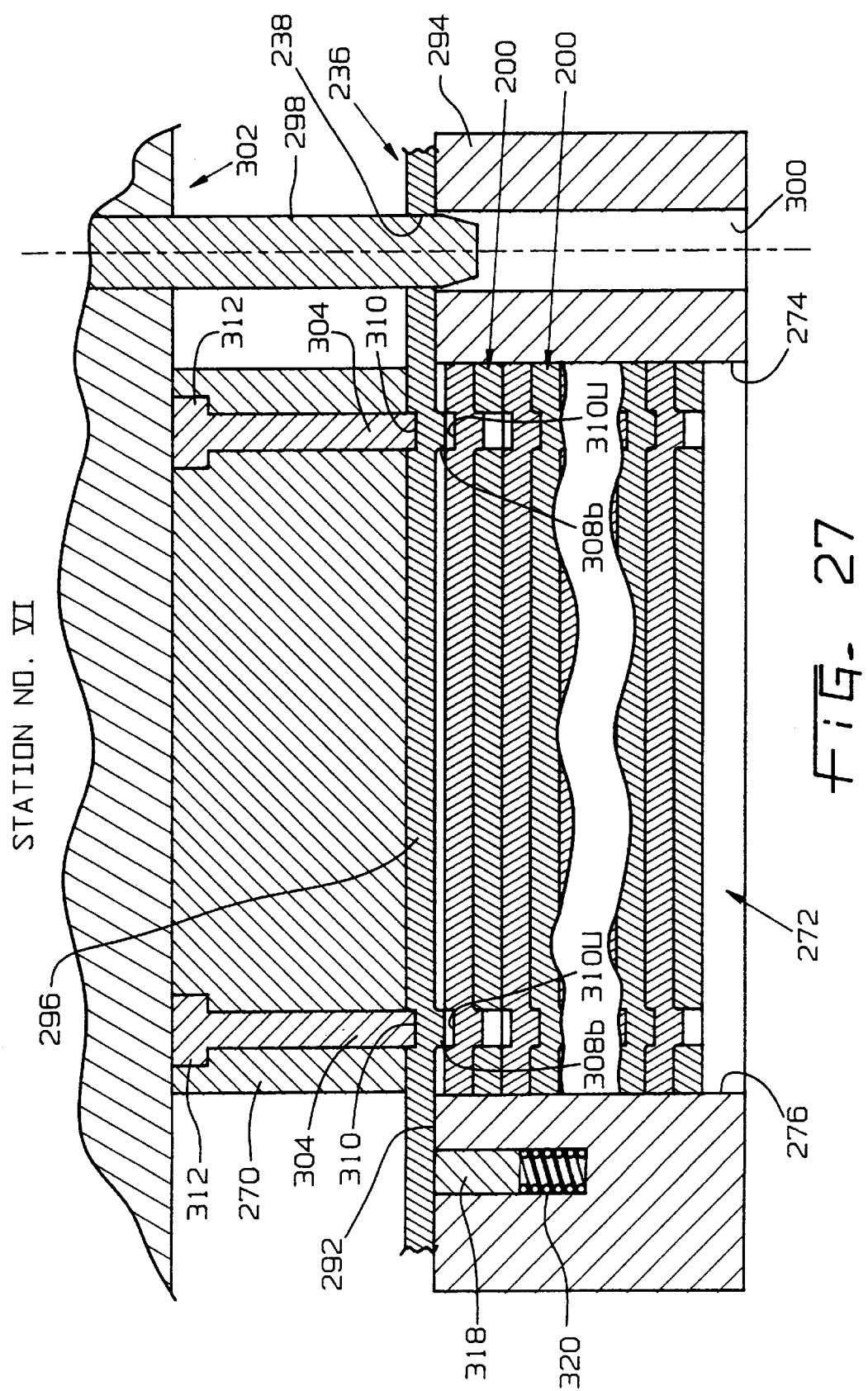
FIG. 27 is a schematic cross sectional view of the die assembly of FIG. 26 after the guide pin has entered the guide bore, a completed and a partially completed stack shown in the choke passageway.

FIG. 26 illustrates the relative positions of upper die assembly 302, punches 270, 304, lower die bed 294 and strip stock material 236 at the initiation of a stamping stroke at the blanking station of the die assembly (Station No. VI of FIG. 22). FIG. 27 illustrates the die assembly during the downstroke after pilot pin 298 has extended through pilot pin hole 238 and has entered guide bore 300 to thereby properly locate strip stock material 236 and lamina 296 attached thereto. Shortly after pilot pin 298 has properly aligned strip stock material 236, and the laminae attached thereto, staking punches 304 enter the interlock slots 310 of the lamina which is about to be blanked. Shortly after staking punches 304 enter interlock slots 310, blanking punch 270 engages the upper surface of the lamina.

Stock lifter spring 320 has been compressed and strip stock material 236 is pressed against upper surface 292 of lower die bed 294 in FIG. 27. Strip stock material 236 may be pressed against lower die bed 294 by engagement with the downwardly moving punches or by another suitable mechanism, such as a spring stripper, attached to upper die assembly 302, which presses the strip stock material against lower die bed 294 prior to the engagement of the punches and strip stock material 236.

Figure 28:
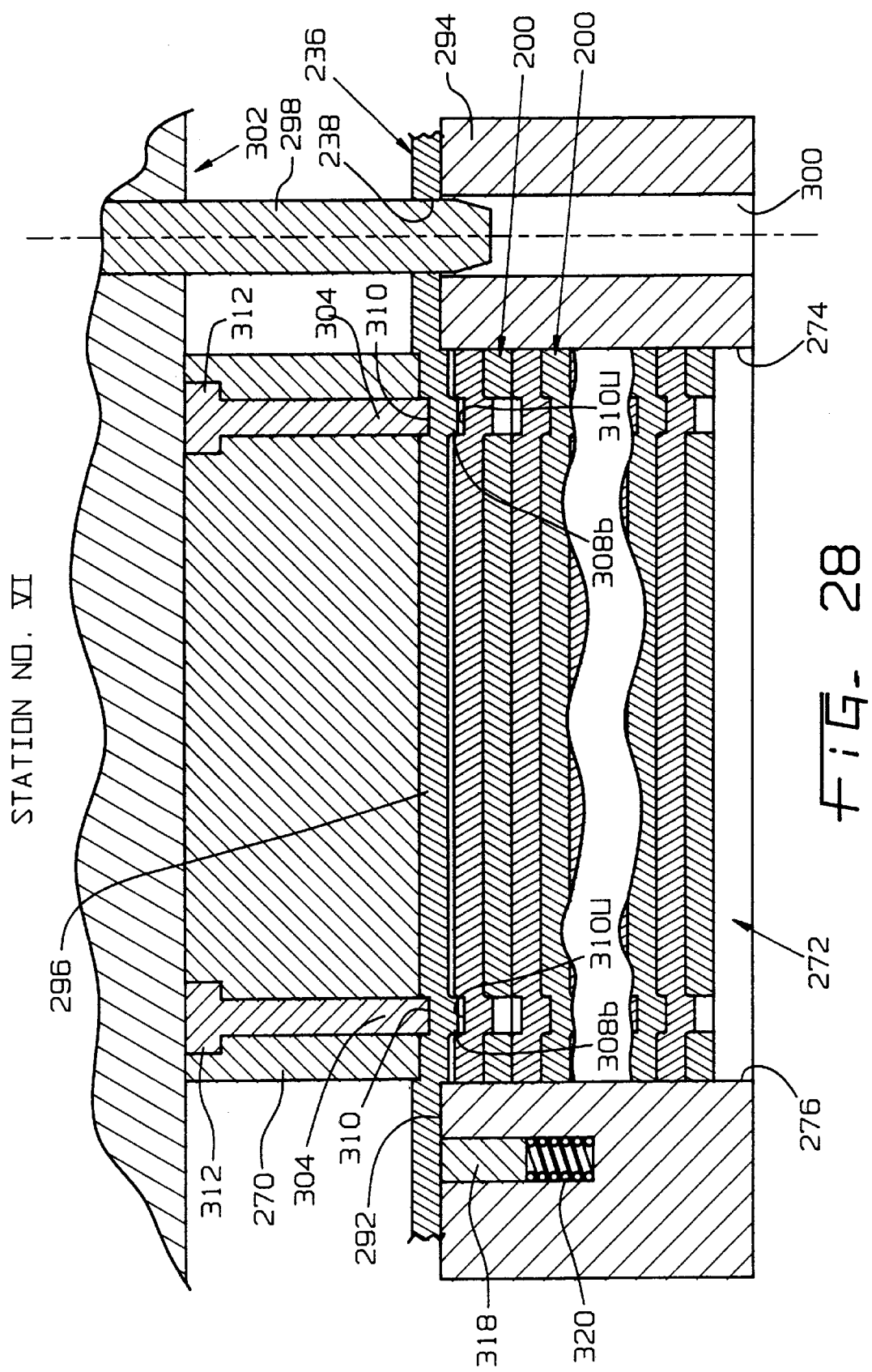
FIG. 28 is a schematic cross sectional view of the die assembly of FIG. 26 wherein the interlock tabs of the lamina being blanked are engaged with the uppermost lamina disposed in the choke passageway, a completed and a partially completed stack shown in the choke passageway.

FIG. 28 illustrates the blanking station after blanking punch 270 has begun to sever lamina 296 from the remainder of strip stock material 236. As shown schematically in FIG. 28, interlock tabs 308*b* of lamina 296 are already partially engaged with interlock slots 310*u* of the uppermost lamina layer in choke passageway 272. The partial engagement of interlock tabs 308*b* and interlock slots 310*u* occurs prior to the complete separation of lamina 296 from the remainder of the strip stock material.

To accomplish the engagement of interlock tabs 308*b* and interlock slots 310*u* of adjacent laminae prior to the complete severing of the blanked lamina layer from the strip stock material 236 the uppermost lamina must be positioned in choke passageway 272 near upper surface 292 of lower die bed 294. The uppermost lamina is positioned a distance 324 (FIG. 26) below the entrance of choke passageway 272 located in upper surface 292 of lower die bed 294.

Distance 324 is determined by the distance blanking punch 270 enters choke passageway 272 at the end of the die assembly downstroke as shown schematically in FIG. 29. Punch entry distance 324 is typically greater than thickness 314 (FIG. 26) of the strip stock material in conventional die assemblies. For example, for a strip stock thickness 314 equivalent to 0.015 inch, a conventional die assembly would often have a punch entry between 0.020 and 0.025 inch.

The present invention, however, utilizes a much smaller punch entry which ensures that interlock tabs 308*b* of blanked lamina 296 are engaged with slots 310*u* of the uppermost lamina layer in the choke passageway prior to completely severing lamina 296 from the remainder of strip stock material 236. For example, by utilizing a distance 324 which is smaller than distance 316 (FIG. 26), tabs 308*b* will be partially interlocked with slots 310*u* when the die assembly reaches the position shown in FIG. 27. Alternatively, distance 324 can be equivalent to distance 306 (FIG. 26) as shown in FIGS. 26–29 and interlock tabs 308*b* will be engaged with slots 310*u* as lamina 296 being blanked is being severed from strip stock material 236 but prior to complete separation as shown in FIG. 29. It may also be possible to have a distance 324 slightly larger than distance 306 and still provide for the partial interlocking of tabs 308*b* and slots 310*u* prior to complete separation of the lamina layer. The partial interlocking in such an arrangement, however, would be minimal.

Blanking punch 270 severs the longitudinal ends of lamina 296 from the remainder of strip stock material 236 in cooperation with cutting edges on the upper lip of choke passageway 272, forming first and second end edges 212, 214. Typically, after blanking punch 270 has sheared the lamina to a depth which is approximately ⅓ of the lamina thickness, the lower ⅔ of the strip stock material will fracture and the lamina layer will be completely separated from the strip stock material. The use of a softer, more elastic strip stock material, however, would permit the blanking punch to enter the strip stock material for more than ⅓ of the lamina thickness and produce a lamina with a smaller fracture zone.

The downstroke is finished by pushing lamina 296 into further engagement with the uppermost lamina in choke passageway 272 and pushing lamina 296 to a depth 324 (FIG. 26) below upper surface 292 of lower die bed 294 as schematically illustrated in FIG. 29. After blanking punch 270 is retracted, stock lifters 318 elevate strip stock material 236, the loose, free end 326 (see FIGS. 22, 29) of which is removed from pin 298 and eventually discarded. The remainder of strip stock material 236 is advanced within the die assembly, and the stamping cycle is repeated.

It should be recognized that although the individual lamina for the stack shown in FIGS. 20 and 21 are rectangular in shape, a structure with lamina of any shape can be manufactured. For instance, the lamina could have a continuous perimeter without any sharp corners, such as ovals or circles. In that case, the choke barrel would contact portions of the continuous edge. The outer perimeter or edge of a lamination could be arbitrarily divided into various portions or "edges". For purposes of this description, the word "edge" could therefore mean a portion of a continuous edge, such as a portion of the outer perimeter of a circular or oval shaped lamination.

A die assembly embodying the present invention may be operated at speeds which are typical for interlocked laminae, e.g., 300 strokes per minute. The maximum speed of operation of any particular die assembly is dependent upon a number of different variables relating to the complexity of the die assembly and the material handling requirements imposed upon the die assembly by the dimensions and configuration of the lamina stack being manufactured. For most lamina stack and die assembly designs, however, the stamping and stacking of two discrete lamina segments to form a single layer in a lamina stack should not, by itself, have a direct impact upon the speed at which individual die assemblies are operated.

The ability to automatically stamp and interlock a plurality of interlocking laminae into an elongate stack having a cross sectional shape having sides which do not conform to a plane parallel with the direction of stack travel through the choke passageway permits the economical manufacture of such parts which might otherwise be more expensively manufactured by methods employing separate stamping, stacking and interlocking means.

Those skilled in the art will recognize that the above-described methods and apparatus may be combined to produce elongate stacks having cross sectional shapes having side surfaces formed by lamina side edges which do not engage choke passageway and in which the lamina layers are comprised of a plurality of discrete lamina segments, each segment provided with interlocking means.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of manufacturing an elongate stack of interlocked laminae in a die assembly having means for guiding strip stock material through the die assembly, stamping means and a choke passageway, said method comprising the steps of:
    stamping a first lamina, said first lamina having a first outside perimeter shape and having generally opposed first, second, third, and fourth edges in the strip stock material;
    stamping at least one first interlock element in the first lamina;
    separating the first lamina from the strip stock material;
    placing the first lamina into the choke passageway;
    stamping a second lamina, said second lamina having a second outside perimeter shape, which is different than said first outside perimeter shape, and having first, second, third, and fourth edges in the strip stock material;
    stamping at least one second interlock element in the second lamina;
    at least partially engaging the first and second interlock elements;
    separating the second lamina from the strip stock material;
    placing the second lamina into the choke passageway; and
    frictionally engaging the choke passageway along the third and fourth edges of only one of the first and second laminae.

2. The method of claim 1, further comprising a step of stamping one of a notch and a protrusion at one of the first and second edges of one of the first and second laminae.

3. The method of claim 2, wherein said step of stamping one of a notch and a protrusion occurs at a die assembly blanking station.

4. The method of claim 2, further comprising one of a step of sliding a notch provided in a lamina over a ridge provided in the choke passageway and a step of sliding a protrusion provided on a lamina in a groove provided in the choke passageway.

5. The method of claim 1, further comprising a step of urging the second lamina into complete interlocking engagement with the first lamina after the step of at least partially engaging the first and second interlock elements.

6. The method of claim 1, wherein one of the first and second interlock elements comprises a protuberance extending from a first surface of one lamina, and an other of the first and second interlock elements comprises a recess provided in a second surface of another lamina, the first and second surfaces disposed adjacent one another, the protuberance received in the recess.

7. A method of manufacturing an elongate stack of interlocked laminae in a die assembly having means for guiding strip stock material through the die assembly, stamping means and a choke passageway, said method comprising the steps of:
    stamping a first lamina in the stock material;
    stamping at least one first interlock element in the first lamina;
    separating the first lamina from the strip stock material to yield a first laminar segment, said first segment having a first outside perimeter shape which has a first edge;
    placing the first laminar segment into the choke passageway;
    stamping a second lamina in the stock material;
    stamping at least one second interlock element in the second lamina;
    at least partially engaging the first and second interlocking elements;
    separating the second lamina from the strip stock material to yield a second laminar segment having a second outside perimeter shape which has a first edge said second perimeter shape different than the first outside perimeter shape; and
    placing the second laminar segment into the choke passageway, the first edge of only one of the first and second laminar segments frictionally engaging the choke passageway.

8. A method of manufacturing an elongate stack of interlocked laminae in a die assembly having means for guiding strip stock material through the die assembly, stamping means and a choke passageway, said method comprising the steps of:
    stamping a first lamina, said first lamina having a first outside perimeter shape and having generally opposed first, second, third, and fourth edges in the strip stock material;
    separating the first lamina from the strip stock material;
    placing the first lamina into the choke passageway;
    stamping a second lamina, said second lamina having a second outside perimeter shape, which is different than said first outside perimeter shape, and having first, second, third, and fourth edges in the strip stock material;
    at least partially engaging the first and second laminae;
    separating the second lamina from the strip stock material;
    placing the second lamina into the choke passageway;
    and frictionally engaging the choke passageway along the third and fourth edges of only one of the first and second laminae.

9. A method of manufacturing a stack of attached laminae in a progressive die assembly having means for guiding planar stock material through the progressive die assembly, stamping means and a choke passageway, said method comprising the steps of:
    feeding the stock material progressively through a plurality of stations in the die assembly;
    stamping a first lamina having a first outer perimeter configuration in the stock material at a first station;
    separating the first lamina from the stock material;
    placing the first lamina into the choke passageway;
    stamping a second lamina having a second outer perimeter configuration which differs from the first outer perimeter configuration in the stock material;
    separating the second lamina from the stock material;

placing the second lamina into the choke passageway;

attaching the first and second lamina to each other;

engaging the choke passageway with at least one of the first and second laminae; and obtaining the completed stack, which comprises attached first and second laminae, from the progressive die assembly.

10. The method of claim 9, wherein said engaging step comprises engaging a surface of the choke passageway with an edge of at least one of the first and second laminae.

11. The method of claim 9, wherein one of the first and second outer perimeter configurations is substantially devoid of sharp edges.

12. The method of claim 11, wherein one of the first and second outer perimeter configurations is substantially rounded.

13. The method of claim 9, wherein the first and second outer perimeter configurations are substantially similar in shape and differ in size.

14. The method of claim 9, wherein said attaching step comprises mechanically interlocking the first and second laminae together.

15. The method of claim 9, wherein at least one of the first and second laminae are substantially elongate.

16. A method of manufacturing a stack of interlocked laminae in a die assembly having means for guiding strip stock material through the die assembly, stamping means and a choke passageway, said method comprising the steps of:

stamping a first lamina having a generally circular edge of a first diameter in the strip stock material;

separating the first lamina from the strip stock material;

placing the first lamina into the choke passageway;

stamping a second lamina having a generally circular edge of a second diameter which differs from the first diameter in the strip stock material;

at least partially engaging the first and second laminae;

separating the second lamina from the strip stock material;

placing the second lamina into the choke passageway;

and frictionally engaging the choke passageway along the generally circular edge of only one of the first and second laminae.

* * * * *

UNITED STATES PATENT AND TRADEMARK OFFICE
CERTIFICATE OF CORRECTION

PATENT NO. : 6,163,949
DATED : DECEMBER 26, 2000
INVENTOR(S) : THOMAS R. NEUENSCHWANDER

It is certified that error appears in the above-identified patent and that said Letters Patent are hereby corrected as shown below:

In the title, change "STACK" to - -STACKS- -

Signed and Sealed this

First Day of May, 2001

Attest:

NICHOLAS P. GODICI

Attesting Officer

Acting Director of the United States Patent and Trademark Office